United States Patent
Olson

(10) Patent No.: US 7,545,594 B2
(45) Date of Patent: Jun. 9, 2009

(54) METHOD AND SYSTEM FOR REMOVING SIGNAL DEFECTS IN MR HEAD SIGNALS

(75) Inventor: Alan R. Olson, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 407 days.

(21) Appl. No.: 11/441,523

(22) Filed: May 26, 2006

(65) Prior Publication Data
US 2007/0273997 A1 Nov. 29, 2007

(51) Int. Cl.
*G11B 5/09* (2006.01)
*G11B 5/02* (2006.01)

(52) U.S. Cl. .......................... 360/53; 360/67

(58) Field of Classification Search ................ None
See application file for complete search history.

(56) References Cited

U.S. PATENT DOCUMENTS

| | | | |
|---|---|---|---|
| 6,147,827 A | 11/2000 | Southerland et al. | |
| 6,335,840 B1 | 1/2002 | Malone | |
| 6,414,806 B1 | 7/2002 | Gowda et al. | |
| 6,724,550 B2 | 4/2004 | Lim et al. | |
| 6,754,015 B2 | 6/2004 | Erden et al. | |
| 2003/0151838 A1* | 8/2003 | Sawaguchi et al. ............ 360/46 |
| 2004/0021970 A1 | 2/2004 | Kondo et al. | |

OTHER PUBLICATIONS

"Electronic Abatement of Thermal Interference in (G)MR Head Output Signals," Klaassen et al.; *IEEE Transactions on Magnetics*, vol. 33, No. 5, Sep. 1997, pp. 2611-2616.

* cited by examiner

*Primary Examiner*—Joseph H Feild
*Assistant Examiner*—Daniell L Negrón
(74) *Attorney, Agent, or Firm*—Eric D. Levinson

(57) ABSTRACT

The disclosure describes a data storage system that includes a signal defect correction system for removing signal defects in magnetoresistive head playback signals. The signal defect correction system utilizes a matched finite impulse response (FIR) filter and digital signal processing algorithms. The matched FIR filter is designed with an impulse response that is the time reversed, complex conjugate of a signal defect model. The signal defect model is generated from a number of sample playback signals. The matched FIR filter is applied to the playback signal and digital signal processing techniques are applied to the filter response to detect a signal defect in the playback signal and estimate the amplitude and location of the signal defect. The signal defect model is retrieved from memory and applied to the playback signal using the amplitude and location estimates to substantially remove the signal defect from the playback signal.

16 Claims, 16 Drawing Sheets

METHOD AND SYSTEM FOR REMOVING SIGNAL DEFECTS IN MR HEAD SIGNALS

TECHNICAL FIELD

The invention relates to reading playback signals from data storage media.

BACKGROUND

Magnetic storage media devices that read and record data on magnetic media, such as magnetic tape or hard disks, use servo control systems to properly position magnetic read/write heads over data tracks recorded on the media. The read/write heads must be quickly moved to and centered over particular tracks as recording and reading of data is performed. The servo control system provides a position signal from one or more servo read heads that read position information or servo patterns recorded in one or more servo tracks on the magnetic storage media. The servo patterns comprise magnetic transitions recorded in a servo track. The magnetic transitions are recorded such that the timing of the position signals read from the servo pattern are decoded to provide the position signal used by the servo system to position read/write heads over desired data tracks of the storage media.

However, the surface roughness of magnetic media can cause a magnetoresistive (MR) head signal defect known as a thermal asperity. Debris, such as dust, and physical structures contribute to the surface roughness of magnetic media. Surface structures on the media can collide with the MR head causing locally high temperatures in the MR stripe. The collision event normally does not result in mechanical damage to the head. However, because the electrical resistance of the MR material is a function of temperature, in addition to external magnetic fields, the temperature change causes a playback signal defect. The signal defect typically appears as an extra pulse and a baseline shift with the normal signal.

The presence of the thermal asperities in the recorded or unrecorded signal can cause difficulty, e.g., momentarily disrupt the recovery of data, in magnetic recording systems. For example, a signal defect resulting from a thermal asperity may be recognized as a signal peak and the resulting baseline shift can interfere with the playback system, even for a period of time after the thermal asperity has passed. Consequently, a thermal asperity signal defect can lead to misreading data in a large portion of a sector.

SUMMARY

In general, the invention is directed to a data storage system that includes a signal defect correction system for removing signal defects in magnetoresistive (MR) head playback signals. The signal defect correction system includes a digital signal processor (DSP) that utilizes a matched finite impulse response (FIR) filter and adaptive digital signal processing algorithms. The matched FIR filter is designed such that the impulse response of the matched filter is the time reversed, complex conjugate of a signal defect model. The signal defect model, i.e., a model generated from a number of sample playback signals that each contains a similar signal defect, is stored in a memory of the DSP. The matched FIR filter is applied to the playback signal and digital signal processing techniques are applied to the filter response to detect a signal defect in the playback signal and estimate the amplitude and location of the signal defect. The signal defect model is retrieved from memory and applied to the playback signal, using the amplitude and location estimates, to correct or substantially remove the signal defect from the playback signal.

The invention is not limited to magnetic tape and may also be applied to magnetic hard disks. Although described herein with respect to magnetic media and, in particular, magnetic tape, the invention may be applied to any system in which a signal defect manifests itself in a digital signal and may be detected and substantially removed from the signal using a matched FIR filter and the described signal processing techniques.

In one embodiment, the invention is directed to a method comprising receiving a playback signal from a magnetoresistive (MR) head in a data storage system, detecting a signal defect in the playback signal, and applying a signal defect model to the playback signal to substantially remove the signal defect from the playback signal.

In another embodiment, the invention is directed to a system for retrieving information stored on magnetic media comprising magnetic media that stores information, an analog front end that retrieves information stored on the magnetic media and outputs a playback signal indicative of the retrieved information, and a processor that detects a signal defect in the playback signal and, in response to detecting the signal defect, substantially removes the signal defect from the playback signal by applying a signal defect model to the playback signal.

In various embodiments, the invention may provide one or more advantages. For example, the signal defect correction system provides an improved method for removing a signal defect from a MR head playback signal. In particular, rather than applying a low pass filter, a high pass filter, or a combination of the two to a playback signal to remove a signal defect from the playback signal, the signal defect correction system utilizes a matched FIR filter and signal processing techniques to detect a signal defect and substantially remove the signal defect from the playback signal. Low and high pass filters may remove signal components from a signal defect as well as from the actual playback signal. In contrast, the matched FIR filter is designed to be a time reversed, complex conjugate copy of a signal defect model that is generated as a best fit model from a number of sample playback signals. As a result, the response of the matched FIR filter may be used to easily detect a signal defect and applying the signal defect model to the playback signal may more completely remove the signal defect from the playback signal than is possible with high and low pass filters and without affecting the integrity of the playback signal.

In addition, because the signal defect model is selected based on a number of sample playback signals from the data storage system, the signal defect correction system provides flexibility to be used for various data storage systems.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
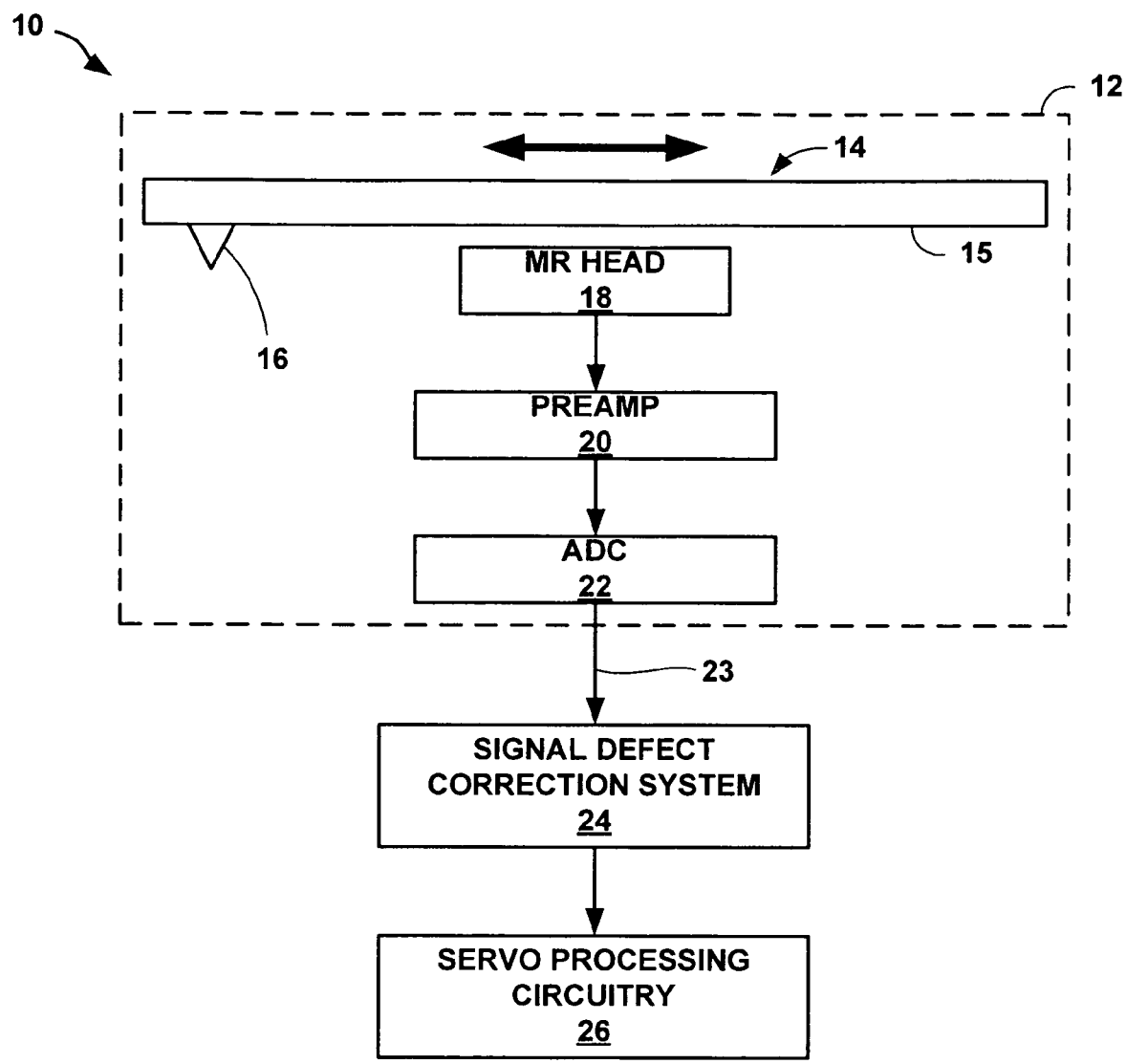
FIG. 1 is a block diagram illustrating a magnetic data storage system for substantially removing signal defects from a magnetoresistive (MR) head signal.

In general, the invention is directed to a data storage system that includes a signal defect correction system for removing signal defects in magnetoresistive (MR) head playback signals. The signal defect correction system includes a digital signal processor (DSP) that utilizes a matched finite impulse response (FIR) filter and adaptive digital signal processing algorithms. The matched FIR filter is designed such that the impulse response of the matched filter is the time reversed, complex conjugate of a signal defect model. The signal defect model, i.e., a model generated from a number of sample playback signals that each contains a similar signal defect, is stored in a memory of the DSP. The matched FIR filter is applied to the playback signal and digital signal processing techniques are applied to the filter response to detect a signal defect in the playback signal and estimate the amplitude and location of the signal defect. The signal defect model is retrieved from memory and applied to the playback signal, using the amplitude and location estimates, to correct or substantially remove the signal defect from the playback signal.

Magnetic storage media devices that read and record data on magnetic media, such as magnetic tape or magnetic hard disks, use servo control systems to properly position magnetic read/write heads. The servo control system provides a position signal from one or more servo read heads that read position information or servo patterns recorded in one or more servo tracks on the magnetic storage media. The position signal is used by the servo system to position read/write heads over desired data tracks of the storage media.

However, signal defects, such as a thermally induced signal defects, can cause difficulty in magnetic recording systems. Surface roughness of magnetic storage media caused by surface structures or asperities on the media can collide with the MR head. Heat generated by the contact with the head normally does not result in mechanical damage to the head, but may change the resistive properties of the MR head causing a thermally induced signal defect or thermal asperity in the playback signal. As a result, the corresponding signal read by the MR head is distorted by a voltage spike and subsequent decay sometimes causing the data stored near the asperity to be unrecoverable.

A signal defect correction system that detects and corrects a playback signal prior to data channel or servo channel processing, as described herein, may be beneficial in testing and grading media and data storage systems in commercial use and improving performance of magnetic recording systems.

As described herein, a signal defect correction system detects a signal defect in a playback signal and corrects the playback signal, i.e., substantially removes a signal defect from the playback signal, prior to servo or data channel processing of the playback signal. The signal defect correction system includes a DSP that utilizes a matched FIR filter and adaptive signal processing algorithms that take advantage of the unique time and spectral signature of the signal defect, i.e., asymmetry in the time domain characterized by a voltage spike and subsequent decay. The matched FIR filter is constructed by selecting a normalized signal defect model and setting the coefficients to a time reversed copy of the normalized signal defect model. The coefficient bit width and FIR length may be selected based on a performance and processing complexity tradeoff. The signal defect model may, for example, be generated by selecting a best fit model based on one or more sample playback signals that each includes a signal defect.

The matched FIR filter is applied to the playback signal and signal processing techniques are applied to the filter response. Because the impulse response of the matched FIR filter is linear and approximates a pulse, the filter has a low amplitude partial response to normal playback signal peaks, but has a large amplitude response to a signal defect. Accordingly, the signal processing techniques may detect a signal defect in the playback signal as well as estimate an amplitude and location of the signal defect. The signal processing techniques may also include tracking the amplitude of normal pattern signal peaks to generate a programmable FIR threshold used for detecting a signal defect. The programmable FIR threshold may be selected larger than the filter response to normal pattern of signal peaks, but smaller than the peak response for the smallest signal defect of interest.

When a signal defect is detected, the signal defect model is retrieved from a memory on the DSP and applied to the playback signal to substantially remove the signal defect from the playback signal. Applying the signal defect model to substantially remove the signal defect from the playback signal involves using the amplitude and location estimates to retrieve the signal defect model at the proper time and scale the signal defect model appropriately. Scaling the signal defect model may include scaling the model based the amplitude estimate and to account for signal loss in circuitry of the DSP and retrieving the signal defect model may include delaying the playback signal in order to apply the scaled signal defect model at the proper time. In some embodiments, the signal defect model may be stored in memory, for example, such that consecutive bits of the signal defect model are stored at consecutive addresses within the memory. In such embodiments, retrieving the signal defect model from memory may comprise retrieving the model from memory and applying the model to the playback signal on a bit-by-bit basis. Consequently, the performance of the signal defect correction system is dependent on the quality of the signal defect model, i.e., how accurately the signal defect model represents the actual signal defect in the playback signal.

The invention is not limited to magnetic tape and may also be applied to magnetic hard disks. Although described herein with respect to magnetic media and, in particular, magnetic tape, the invention may be applied to any system in which a signal defect manifests itself in a digital signal and may be detected and substantially removed from the signal using a matched FIR filter and the described signal processing techniques.

FIG. 1 is a block diagram illustrating a data storage system 10 for reading data from surface 15 of magnetic storage media 14. In the illustrated example, data storage system 10 includes an analog front end 12, signal defect correction system 24, and read/servo channel processing circuitry 26. Analog front end 12 and servo processing circuitry 26 include elements typically used for reading data, e.g., servo data, from surface 15 of magnetic media 14. Analog front end 12 outputs playback signal 23, i.e., a playback signal including a thermally induced signal defect or thermal asperity that may result in circuitry 26 being unable to recover data read from magnetic media 14. However, signal defect correction system 24, as described herein, utilizes a matched FIR filter and digital signal processing algorithms that exploit the unique time and spectral signature of the signal defect to substantially remove the signal defect from playback signal 23 thereby improving the performance of data storage system 10.

In general, FIG. 1 is intended to illustrate a typical data storage system. In the illustrated example, analog front end 12 includes magnetic media 14, MR head 18, preamplifier 20, and analog-to-digital converter (ADC) 22. Magnetic media 14 may comprise magnetic tape or a hard disk. In the description that follows, details of the invention will be provided in the context of a data tape storage system but the invention is not so limited. When implemented as a data tape storage system, for example, MR head 18 can be interpreted to include any necessary drive circuitry, motor or actuator, and controller which may be needed to drive MR head 18 in a manner known in the art. For example, analog front end 12 may include spools for holding magnetic tape, a feeder mechanism to unspool magnetic tape from a first spool and wind magnetic tape around a second spool, and guides to facilitate positioning the magnetic tape. However, it should be recognized that other elements, e.g., circuits and/or components, may be included or substituted for, those shown in FIG. 1 without changing the scope of the invention or limiting the invention as broadly described in this disclosure.

Further, it is understood that data storage system 10 in the form of a data tape storage system is merely one exemplary embodiment of the invention. As an example, data storage system 10 may also be embodied as a hard disk data storage system in which magnetic media 14 comprises a hard disk and MR head 18 is carried on a slider (not shown) which flies over surface 15 of magnetic media 14 or any system in which a digital signal includes a signal defect that may be detected and substantially removed from the signal using a matched FIR filter and the signal processing techniques described in this disclosure.

During normal operation of data storage system 10, magnetic media 14 moves across MR head 18 (in the case of magnetic tape) or, alternatively, MR head 18 flies over surface 15 of magnetic media 14 (in the case of a hard disk) and produces a playback signal indicative of data read from surface 15 of magnetic media 14. When implemented as a data tape storage system, MR head 18 may be used for reading data from magnetic media 14 or writing data to magnetic media 14 and includes electromagnetic elements that generate magnetic fields, such as a transducer. MR head 18 defines a write or read gap from which a magnetic field permeates to facilitate reading data from magnetic media 14.

For example, MR head 18 may include "write heads" and "read heads" to write data to and read data from magnetic media 14, respectively. A write head may comprise an electromagnet, such as a ferromagnetic core wrapped with a wire coil and may define a magnetic gap oriented transverse to the path of magnetic media 14. As electric current passes through the windings, a magnetic flux is generated in the ferromagnetic material and a magnetic field is generated in the gap. By placing the gap in close proximity to magnetic media 14, the magnetic state of media 14 can be altered by the field generated at the gap. The write head may be movable in lateral directions across the width of media 14 to access different tracks. For example, a stepper motor, voice coil servo, or the like, may allow for lateral movement of MR head 18 relative to magnetic media 14 in order to facilitate positioning with respect to different tracks on magnetic media 14. A read head includes a sensor mechanism, such as an MR stripe, and uses magneto-resistive materials to read data from magnetic media 14. The MR stripe is shaped to sense the remnant magnetic field on magnetic media 14 and operates like a resistor in that the resistance is a function of an external magnetic field.

In order to read information from magnetic media 14, MR head 18 may be positioned proximal to or in physical contact with surface 15 of magnetic media. By way of example, magnetic tape may be housed in a cartridge and a motor or feeder mechanism that allows for automated unspooling of magnetic tape between two spools within the cartridge may feed magnetic tape into the proximity of MR head 18. As the magnetic tape is fed into the proximity of MR head 18, the magnetizations on the magnetic tape are captured by MR head 18. For example, the magnetizations may be captured by the MR stripe of a read head carried by MR 18 causing a proportional change in resistance and voltage drops through MR head 18. The voltage drops, in turn, form a playback signal and may be interpreted by servo processing circuitry 26 to read the data stored on magnetic media 14.

For example, the playback signal may comprise a position signal used by servo processing circuitry 26 to position MR head 18 over desired data tracks of media 14. In some embodiments, MR head 18 may comprise one or more servo read heads that provide a position signal from one or more servo read heads that read position information or servo patterns recorded in one or more servo tracks on media 14. The servo patterns comprise magnetic transitions recorded in a servo track such that the timing of positions signals read from the servo pattern are decoded to provide the position signal used by servo processing circuitry 26 to position MR head 18 over desired data tracks recorded on media 14. In this manner, data storage system 10 may properly position MR head 18 across the width of the media 14, i.e., properly position MR head 18 over particular tracks.

Preamplifier 20 amplifies the output of MR head 18 and provides the amplified signal to ADC 22. ADC 22 converts the analog playback signal to a digital playback signal 23 in accordance with analog-to-digital conversion techniques known in the art. In this disclosure, playback signal 23 includes a thermally induced signal defect or a thermal asperity.

Figure 6A:
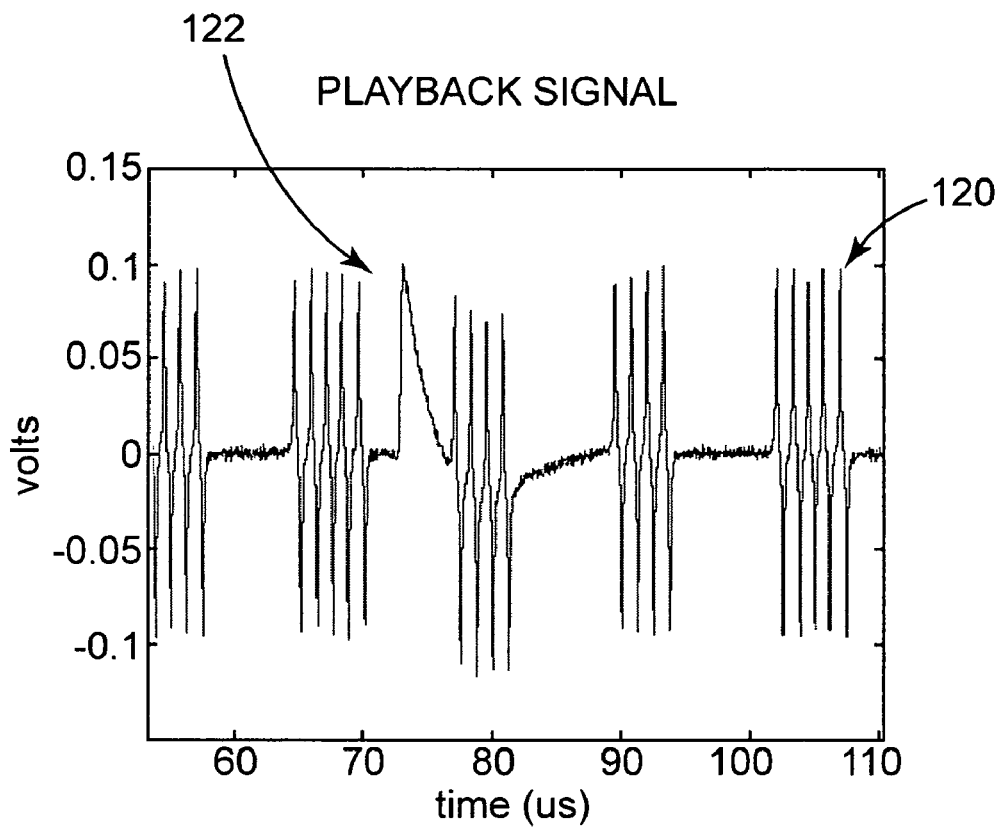
FIGS. 6A and 6B are graphs illustrating an exemplary signal defect and signal defect model, respectively.
Figure 7A:
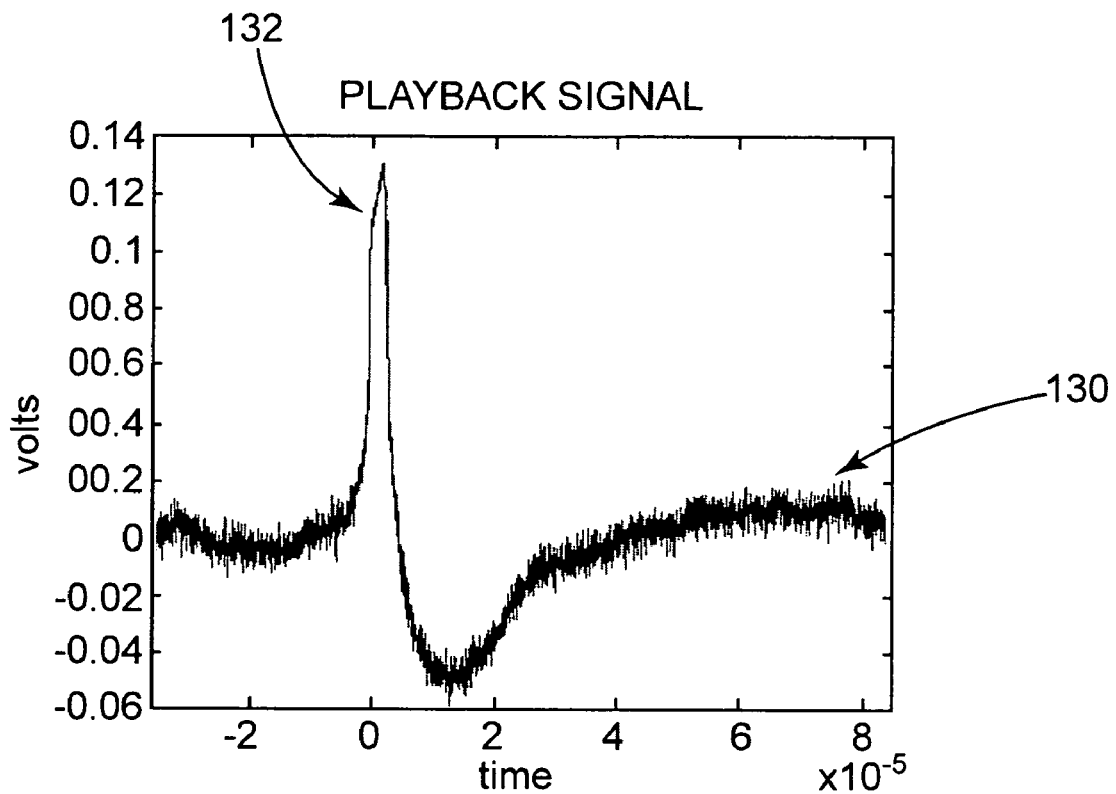
FIGS. 7A and 7B are graphs illustrating another exemplary signal defect and signal defect model, respectively.

A thermal asperity may be caused by a contact between magnetic media 14 and MR head 18. Accordingly, surface roughness of magnetic media 14, e.g., dust and physical structures, can cause a contact with MR head 18. In the illustrated example, physical structure 16 is positioned on surface 15 of media 14 such that MR head 18 contacts structure 16 as media 14 moves across MR head 18 causing a thermal asperity in playback signal 23. When MR head 18 contacts the surface of the media 14, i.e., physical structure 16, a significant increase in the temperature of MR head 18 may be observed. Heat generated by the contact between MR head 18 and physical structure 16 normally does not result in mechanical damage to the head, but may change the resistive properties of MR head 18. Because the electrical resistance of the MR material is a function of temperature, in addition to external magnetic fields, the temperature change causes a voltage spike and subsequent decay in the playback signal until it reaches its normal value as the MR head cools. This signal defect, i.e., the voltage spike and subsequent decay, may cause difficulty in storage system 10, such as momentarily disrupting the recovery of data. FIGS. 6A and 7A illustrate example playback signal from different data storage systems.

In some cases, the thermally induced signal defect or thermal asperity may cause data stored near the asperity to be unrecoverable. For example, a signal defect resulting from a thermal asperity may be recognized as a signal peak and the resulting baseline shift can interfere with storage system 10, even for a period of time after the thermal asperity has passed. Consequently, a thermally induced signal defect may lead to misreading data in a large portion of a sector.

Signal defect correction system 24 receives playback signal 23 and, in response to detecting a signal defect in playback signal 23, substantially removes the signal defect as described herein. Consequently, the output of signal defect correction system 24 may be substantially free of signal defects, such as thermally induced signal defects caused by structure 16, and circuitry 26 may reliably recover data from media 14.

Signal defect correction system 24 may include a DSP that utilizes a matched FIR filter and adaptive signal processing algorithms that take advantage of the unique time and spectral signature of a thermally induced signal defect. In particular, because the signal defect is asymmetric in the time domain due to the voltage spike and subsequent decay, the matched FIR filter response has a low amplitude partial response to normal playback signal peaks due to a poor match over time and a large amplitude response when the signal defect is detected. Consequently, the signal processing techniques may be applied to the response of the matched FIR filter to detect a signal defect in a playback signal.

The matched FIR filter is constructed by selecting a signal defect model and setting the coefficients to a time reversed copy of the signal defect model. The signal defect model may be selected by generating a best fit model from a plurality of sample playback signals that each includes a signal defect. The coefficient bit width and FIR length of the matched FIR filter may be selected based on a performance and processing complexity tradeoff.

Signal defect correction system 24 applies the matched FIR filter to playback signal 23 and signal processing techniques to the response of the matched FIR filter. Because the impulse response of the matched FIR filter is linear and approximates a pulse, the signal processing techniques may be designed to detect a signal defect as well as estimate an amplitude and location of the signal defect. The signal processing techniques may also be designed to track the amplitude of normal pattern signal peaks to generate a programmable FIR threshold used for detecting a signal defect in playback signal 23. The programmable FIR threshold may be selected larger than the filter response to normal pattern signal peaks, but smaller than the peak response for the smallest signal defect of interest.

When a signal defect is detected, the signal defect model is retrieved from a memory of the signal defect correction system 24 and applied to playback signal 23 to substantially remove the signal defect. The location and amplitude estimates are used to retrieve the signal defect model at the proper time and scale the signal defect model appropriately. For example, signal defect correction system 24 may delay playback signal 23 by a length of time determined by the length of the FIR matched filter and other logic delays. Thus, the signal defect model may be retrieved from memory in accordance with the location estimate and a pre-determined delay constant. In some embodiments, for example, the signal defect model may be stored in memory such that consecutive bits of the signal defect model are stored at consecutive addresses within the memory. In such embodiments, the signal defect model is retrieved from memory and applied to playback signal 23 on a bit-by-bit basis. However, the invention is not limited as such. Rather, the signal defect model may be stored in memory such that more than one bit of the signal defect model is stored per memory address. For example, a signal defect model formed from 66 bits may be stored at consecutive addresses within a memory such that 3 bits are stored per memory address. Thus, it is understood that storing consecutive bits of the signal model at consecutive addresses within the memory is merely one embodiment of the invention.

Additionally, the signal defect model may be scaled after being retrieved from memory and prior to being applied to playback signal 23. The signal defect model may be scaled, for example, based on the amplitude estimate and to account for signal loss in circuitry of signal defect correction system 24. Consequently, in order to substantially remove a signal defect from playback signal 23, signal defect correction system 24 delays playback signal 23, e.g., by using a buffer, and applies a signal defect model that is retrieved from a memory at a proper time and scaled appropriately to the delayed playback signal. Using the matched FIR filter and signal processing techniques described in this disclosure, signal defect correction system 24 may substantially remove thermally induced signal defects from playback signal 23.

Servo processing circuitry 26 uses the output of signal defect correction circuitry 24 to position MR head 18 over data tracks on magnetic media 14. Because the output of signal defect correction system 24 may be substantially void of thermally induced signal defects, servo processing circuitry 26 may reliably read data from magnetic media 14. Consequently, signal defect correction system 24 may be beneficial in testing and grading media for data storage systems in commercial use and for improving performance of magnetic data storage systems.

In general, the performance of signal defect correction system 24 and, thus, the performance of system 10, may be dependent on the quality of the signal defect model, i.e., how well the signal defect model represents actual signal defects in playback signals. System 10 may provide improved performance over systems which use high pass filters, low pass filters, or a combination of both to remove signal defects from a playback signal. For example, low and high pass filters may remove signal components from a signal defect as well as from the actual playback signal. In contrast, the matched FIR filter as described in this disclosure is generated as a best fit model from a number of sample playback signals. Further, the signal defect model is retrieved from memory and scaled based on location and amplitude estimates obtained from the playback signal rather than some pre-determined thing. As a result, the response of the matched FIR filter may be used to reliably detect a signal defect and applying the signal defect model to the playback signal may more completely remove the signal defect from the playback signal than is possible with high and low pass filters and without affecting the integrity of the playback signal.

Figure 2:
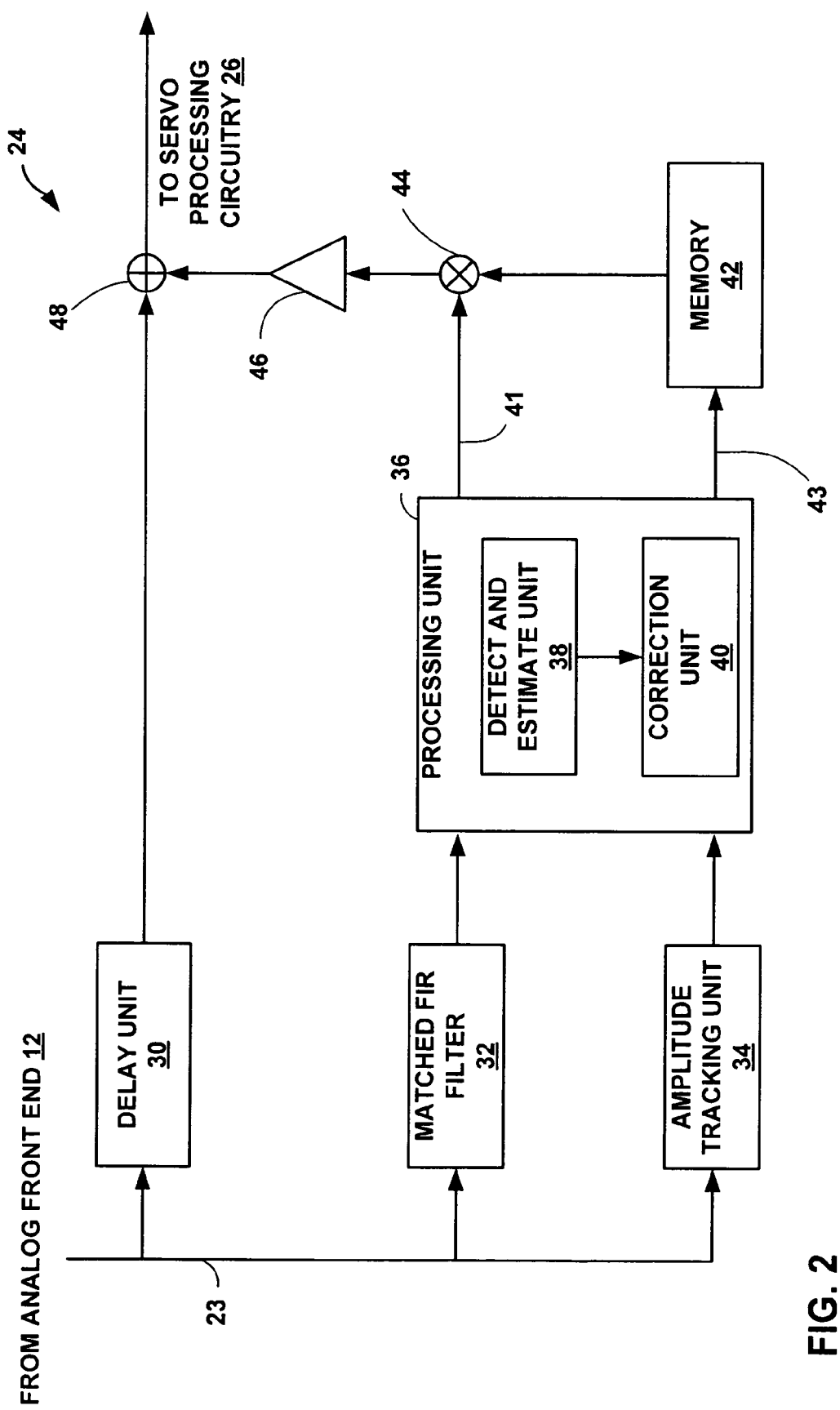
FIG. 2 is a block diagram illustrating a signal defect correction system of the data storage system.

FIG. 2 is a block diagram illustrating signal defect correction system 24 of magnetic data storage system 10. In general, signal defect correction system 24 receives playback signal 23 from analog front end 12 and substantially removes a signal defect from playback signal 23 by applying a signal defect model to playback signal 23. As previously described with respect to FIG. 1, playback signal 23 includes a thermally induced signal defect that disrupts the recovery of data from magnetic media 14 in magnetic data storage system 10. Without correcting playback signal 23 prior to the signal being received by servo processing circuitry 26, the data stored near the signal defect may be misread or marked unusable by the system.

Signal defect correction system 24 applies a matched FIR filter to playback signal 23 to detect a signal defect in playback signal 23. When signal defect correction system 24 detects a signal defect, signal processing techniques are applied to playback signal 23 as described in this disclosure to estimate the location and amplitude of the signal defect. The location and amplitude estimate are used to scale and apply a normalized signal defect model to playback signal 23 to substantially remove the signal defect. Consequently, signal defect correction system 24 only removes signal components associated with the signal defect from playback signal 23 and the integrity of playback signal 23 is substantially unaffected. If signal defect correction system 24 does not detect a signal defect in playback signal 23, playback signal 23 is unaffected and output to servo processing circuitry 26. As a result, servo processing circuitry 26 may reliably position MR head 18 to read data from magnetic media 14 thereby improving the performance of magnetic data storage system 10.

In the illustrated example, signal defect correction system 24 includes delay unit 30, matched FIR filter 32, amplitude tracking unit 34, processing unit 36, memory 42, multiplier 44, amplifier 46, and adder 48. As shown in FIG. 2, delay unit 30, matched FIR filter 32, and amplitude tracking unit 34 each receive playback signal 23 as an input. Delay unit 30 may comprise a buffer or sample and hold circuit that delays playback signal 12 by a pre-determined length of time. The length of time may be determined by the length of matched FIR filter 32 and logic delays associated with processing unit 36 as well as multiplier 44, amplifier 46, and adder 48. By delaying playback signal 23, signal defect correction system 24 can process playback signal 23 to detect a signal defect, generate an amplitude and location estimate of the signal defect, and use the estimates to retrieve and scale a normalized signal defect model such that when the signal defect model is applied to the delayed playback signal, the signal defect is substantially removed.

Amplitude tracking unit 34 and matched FIR filter 32 process playback signal 23 to generate output used by processing unit 36 to detect the signal defect and form amplitude and location estimates for the signal defect. In particular, processing circuitry 36 uses the output of matched FIR filter 32 and amplitude tracking unit 34 to detect a signal defect and form an amplitude and location estimate for the signal defect. Matched FIR filter 32 comprises a digital FIR filter and may be designed such that its impulse response is the time reversed, complex conjugate of the signal defect model for playback signal 23. In other words, the coefficients of matched FIR filter 32 are set to the time reversed coefficients for the signal defect model.

Memory 42 stores the signal defect model and may comprise volatile or non-volatile memory, such as random access memory (RAM), read only memory (ROM), electrically erasable programmable read only memory, flash memory, and the like. In particular, the signal defect model may be stored in memory 42 such that consecutive bits of the signal defect model are stored at consecutive addresses within memory 42. Accordingly, the signal defect model may be retrieved on a bit-by-bit basis by reading consecutive addresses of memory 42. However, as previously described, the signal defect model may be stored in memory 42 such that more than one bit of the signal defect model is stored per memory address without changing the scope of the invention as described in this disclosure.

The signal defect model may, for example, be generated by selecting a best fit model based on a plurality of sample playback signals that each includes a signal defect. As previously described in this disclosure, a thermally induced signal defect is asymmetric in the time domain and normally characterized by a voltage spike and subsequent decay. FIGS. 6A and 6B and 7A and 7B illustrate exemplary signal defects and corresponding signal defect models for two different magnetic data storage systems. The corresponding autocorrelation functions for the two magnetic data storage systems are shown in FIGS. 8A and 8B and are each characterized by a large amplitude at the origin and values approximately zero everywhere else. The distinct single peak in the autocorrelation function indicates that the signal defect may be detected using a matched FIR filter as described in this disclosure. In particular, because matched FIR filter 32 is designed to have an impulse response that is the time reversed, complex conjugate of the signal defect, the response of matched FIR filter 32 to a signal defect in playback signal 23 may be substantially similar to the autocorrelation of the signal defect.

Figure 9:
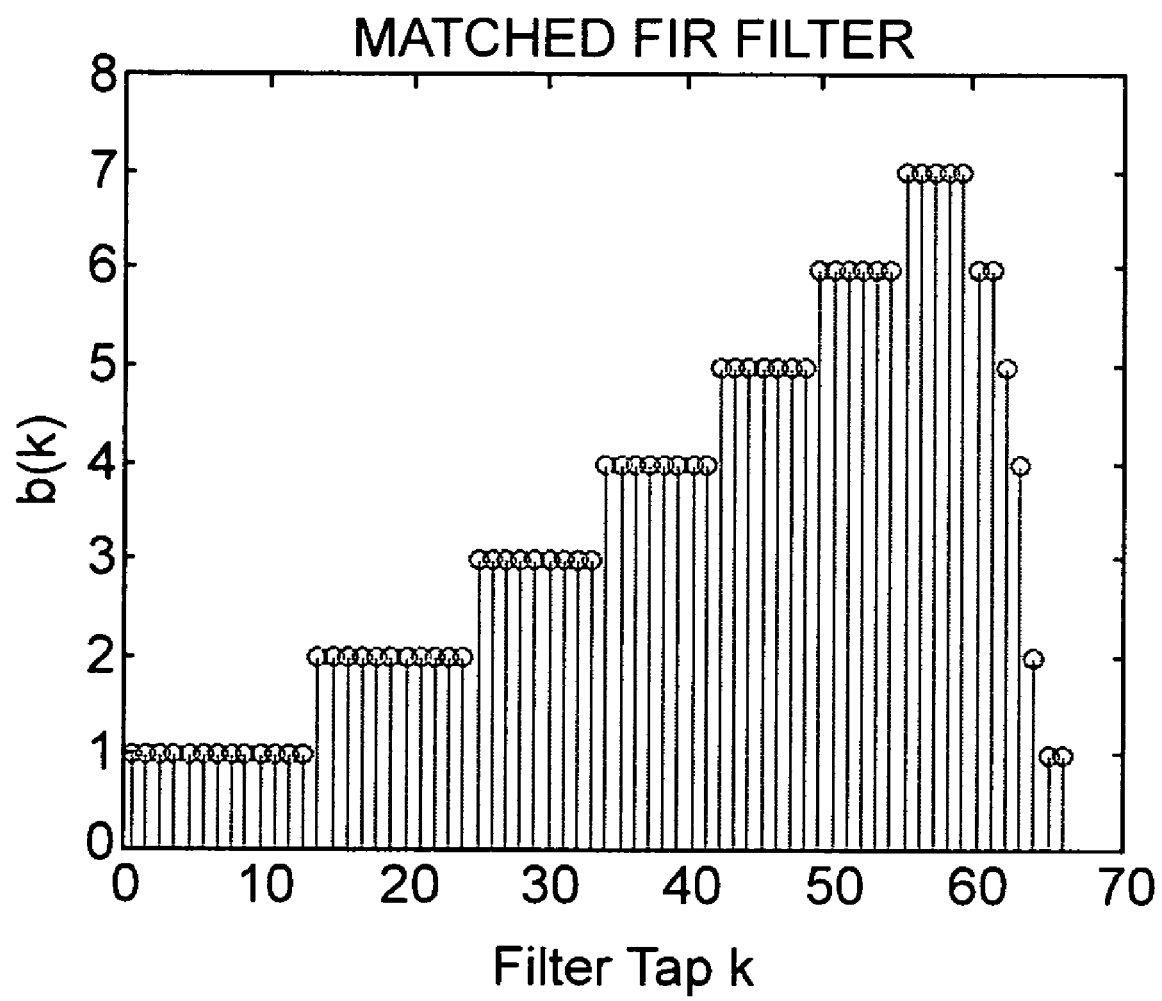
FIG. 9 is a graph illustrating a finite impulse response (FIR) matched filter of the digital signal processing unit (data storage system).

Designing matched FIR filter 32 may include digitizing the signal defect model to a selected coefficient bit width and FIR length and setting the coefficients for filter 32 as a time reversed copy of the signal defect model. A relatively small FIR window with narrow coefficients and a length of less than approximately 100 taps may be sufficient to detect a signal defect. FIG. 9 illustrates an exemplary matched FIR filter. In any case, the coefficient bit width and FIR length may be selected based on a performance and processing complexity tradeoff. In other words, a filter designed with a larger coefficient bit width and greater length may provide improved performance, but at the expense of increased processing complexity. Accordingly, the coefficient bit width and FIR length may be carefully selected to provide the desired performance with the least amount of processing complexity.

Figure 10:
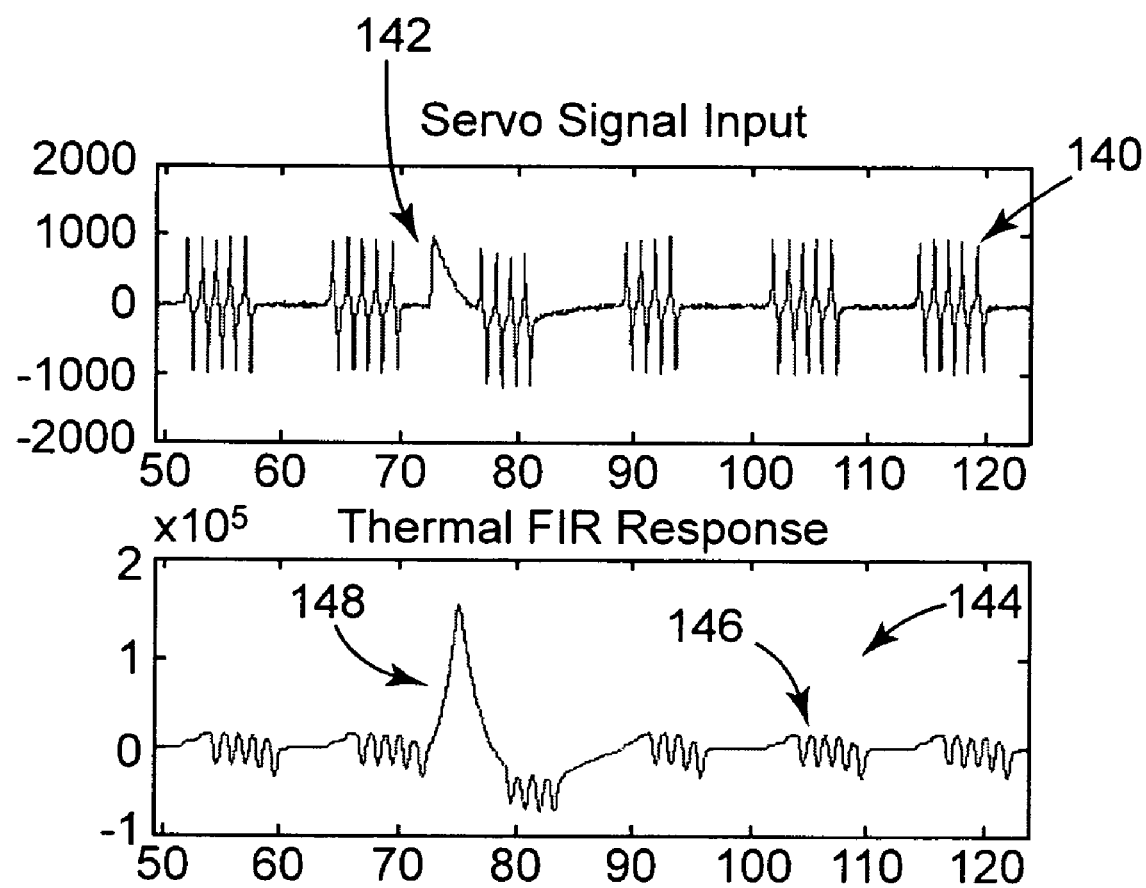
FIG. 10 is a graph illustrating a servo signal input signal and a response of a FIR matched filter to the input signal.

The impulse response of matched FIR filter 32 is linear and approximates a pulse. As a result, when matched FIR filter 32 is applied to playback signal 23, filter 32 has a low amplitude partial response to normal playback signal peaks due to a poor match over time, but has a large amplitude response to a signal defect. FIG. 10 illustrates an exemplary playback signal and response of a matched FIR filter to the playback signal. Because matched FIR filter 32 is linear, the peak response of filter 32 is proportional to the peak amplitude of the signal defect and to the peak amplitude of the normal signal peaks.

Amplitude tracking unit 34 separately tracks the amplitude of normal pattern signal peaks to establish a programmable FIR response threshold. For example, the FIR response threshold may be programmed to be larger than the partial response for normal pattern signal peaks but smaller than the peak response for the smallest signal defect of interest. The programmable FIR response threshold may be useful for grading magnetic media for commercial use. For example, magnetic media that exhibits a lower percentage of signal defects when applying signal defect correction system 24 with a stringent FIR response threshold may be given a high grade and sold for a higher price than magnetic media with a higher percentage of signal defects using the same FIR response threshold. In this manner, a system may be designed for grading magnetic media based on the percentage of signal defects detected for a given FIR response threshold.

Processing unit 36 uses the response of matched FIR filter 32 and the FIR response threshold output by amplitude tracking unit 34 to detect a signal defect in playback signal 23 and form an amplitude and location estimate of the signal defect. Additionally, processing unit 36 retrieves the signal defect model from memory 42 and scales the model appropriately using the location and amplitude estimates, respectively. Processing unit 36 includes detect and estimate unit 38 and correction unit 40.

Detect and estimate unit 38 may apply signal processing techniques known in the art to detect a signal defect in playback signal 23. In particular, detect and estimate unit 38 may detect a signal defect in playback signal 23 by comparing the response of matched FIR filter 32 to playback signal 23 to the FIR response threshold provided by amplitude tracking unit 34. For example, detect and estimate unit 38 may compare the response of filter 32 to each sample of playback signal 23 to the FIR response threshold. When the response is greater than the FIR response threshold, a signal defect has been detected. In some embodiments, amplitude tracking unit 34 may provide two FIR response thresholds, e.g., a "HIGH" and a "LOW" threshold. The HIGH and LOW thresholds may provide hysteresis for a degree of noise immunity. In this case, detect and estimate unit 38 may determine a signal defect to be a portion of playback signal 23 that exceeds the HIGH and LOW thresholds on a positive and negative slope, respectively. In any case, when a signal defect has been detected, detect and estimate unit 38 may store the peak amplitude estimate of the signal defect.

Detect and estimate unit 38 may use the peak amplitude estimate to scale the signal defect model retrieved from memory 42. In particular, because the impulse response of matched FIR filter 32 is linear, the peak response of matched FIR filter 32 is proportional to the peak amplitude of the signal defect and the peak amplitude of the normal signal. Thus, the peak value of the response of matched FIR filter 32 may be used as the estimate of the signal defect. Accordingly, the peak value of the response of matched FIR filter 32 may be applied to multiplier 44 to properly scale the signal defect model retrieved from memory 42. In FIG. 2, processing unit 36 supplies the scaling ratio to multiplier 44 as signal 41.

Further, detect and estimate unit 38 may also store a location or delay estimate that corresponds to the location of the signal defect in time. The delay estimate may be dependent on the length of the matched FIR filter 32 and logic delays associated with processing unit 34, multiplier 44, amplifier 46, and adder 48. In some embodiments, the detect and estimate unit 38 may decrement the delay estimate each clock cycle from the time that detect and estimate unit 38 detects the peak amplitude of playback signal 23 to the time that the value of playback signal 23 is less than the LOW threshold. The resulting value, i.e., the remaining value of the delay estimate, may be used as the location estimate by correction unit 40.

Correction unit 40 may use the location estimate to retrieve the signal defect model from memory 42 at the proper time. As an example, correction unit 40 may include a counter that is loaded with the location estimate when detect and estimate unit 38 determines that playback signal 23 has dropped below the LOW threshold. Correction unit 40 may increment the counter with each clock cycle until the value of the counter is equal to the location estimate. At this time, correction unit 40 may generate the signal defect model by loading the address of memory 42 at which the signal defect model is stored, i.e., the address at which the most significant bit of the signal defect model is stored. In FIG. 2, signal 43 loads the address of memory 42 to retrieve the most significant bit of the signal defect model. With each clock cycle, correction unit 40 may increment the address such that the signal defect model is retrieved from memory 42 on a bit-by-bit basis. As previously described, the signal defect model may also be stored such that more than one bit, i.e., a block of bits, of the signal defect model is stored per memory address. Accordingly, in such embodiments, correction unit 40 may load and increment the address in the same manner to retrieve the signal defect model on a block-by-block basis.

Because memory 42 stores a normalized signal defect model, multiplier 44 multiplies each bit of the signal defect model retrieved from memory 42 by a value based on the peak amplitude estimate, i.e., the peak value of the response of matched FIR filter 32 to playback signal 23. Thus, the output of multiplier 46 is the properly scaled signal defect model. Amplifier 48, however, amplifies the scaled signal defect model to account for signal loss in signal correction system 24 and also inverts the scaled signal defect model so that its output substantially cancels the signal defect of playback signal 23 when applied to the delayed playback signal by adder 48. As a result, the signal output to servo processing circuitry 26 may be substantially void of a signal defect thereby enabling servo processing circuitry 26 to reliably read data from magnetic media 14.

The illustrated components of signal defect correction system 24 may be implemented within one or more DSPs, microprocessors, application specific integrated circuits (ASICs), field programmable gate array (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry.

Figure 3:
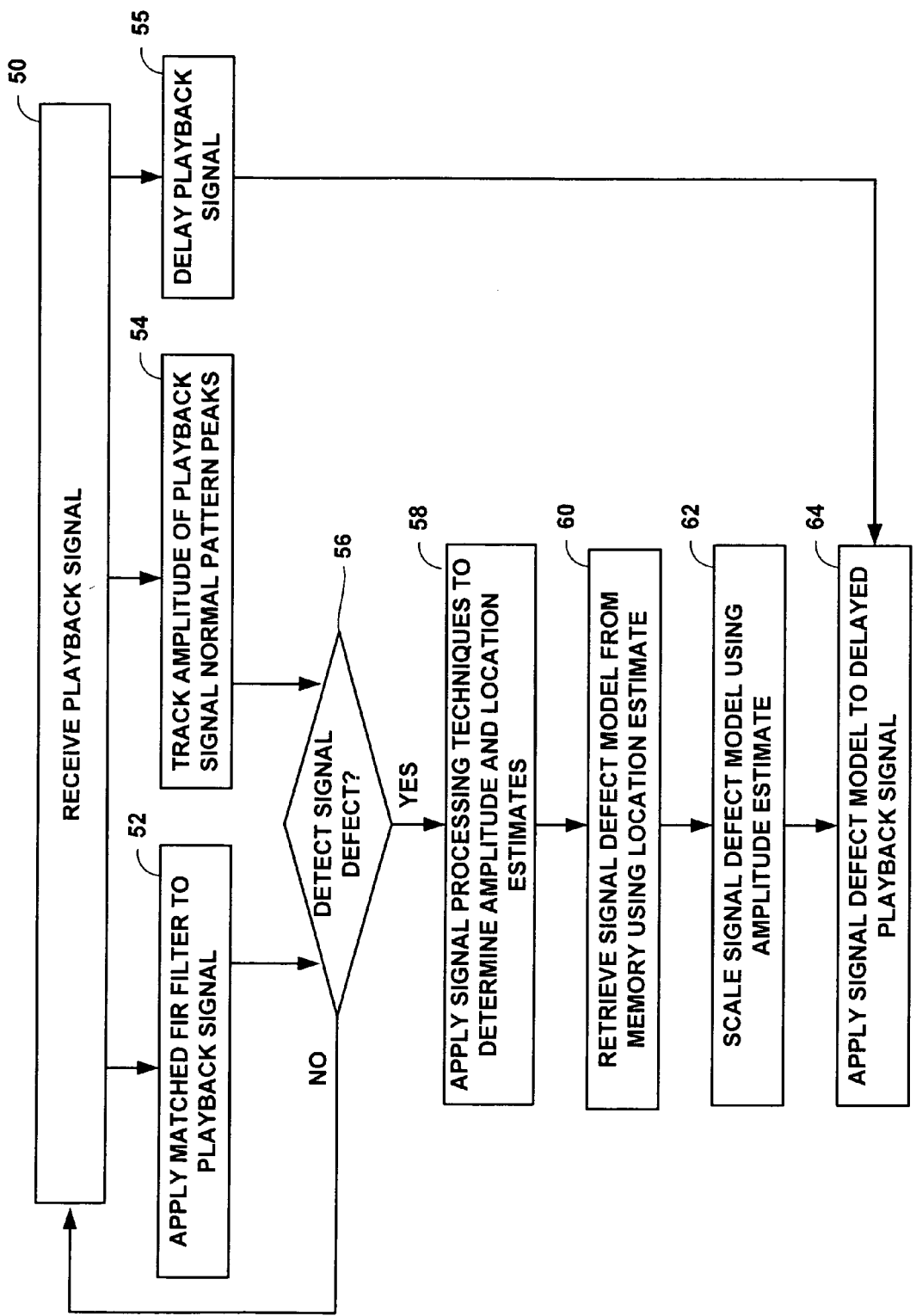
FIG. 3 is a flowchart illustrating exemplary operation of the signal defect correction system.

FIG. 3 is a flowchart illustrating exemplary operation of signal defect correction system 24. As previously described in this disclosure, signal defect correction system 24 utilizes a matched FIR filter and digital signal processing techniques to substantially remove a signal defect, such as a thermally induced signal defect, from a playback signal.

Figure 12:
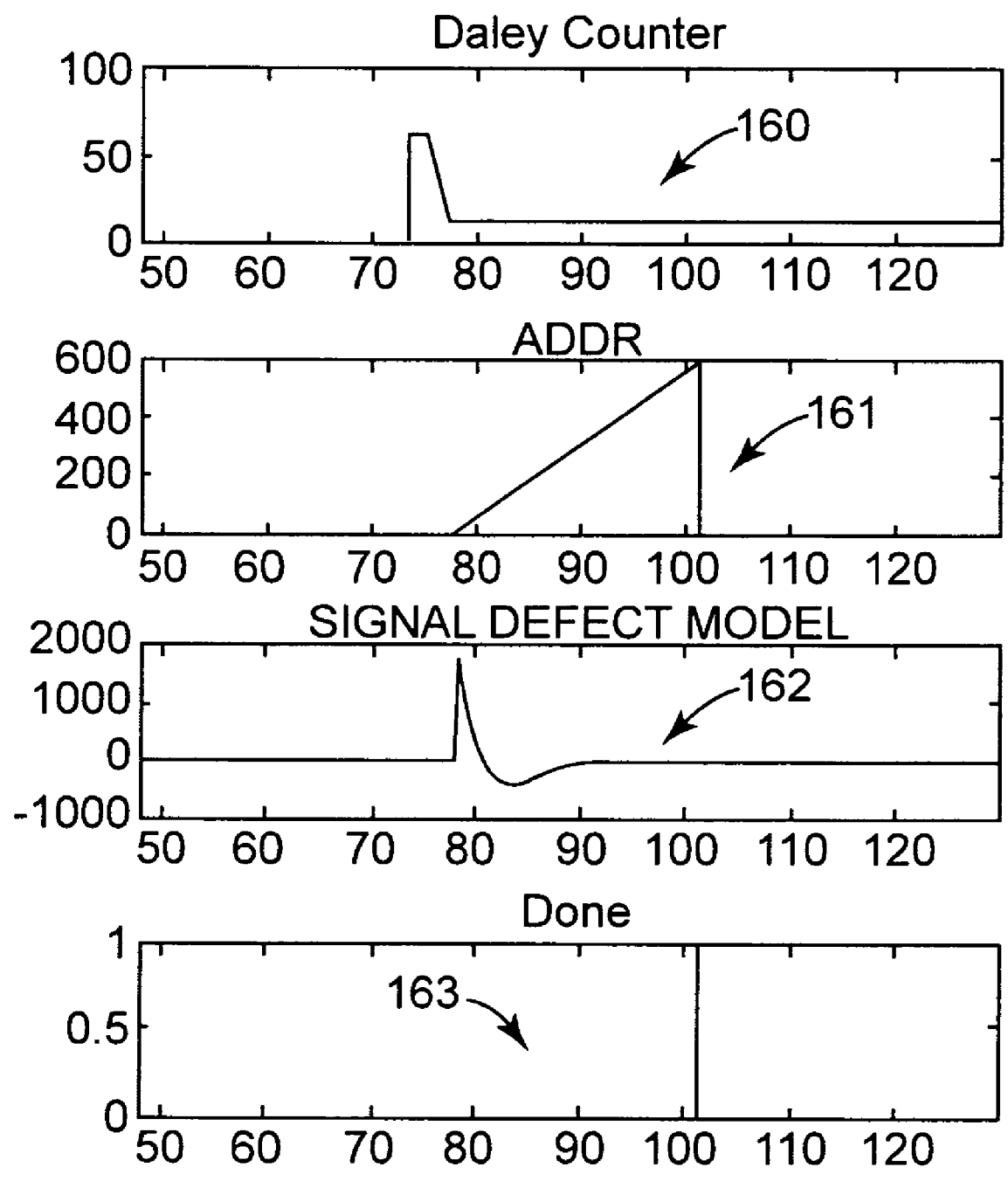
FIG. 12 shows graphs illustrating logic output of the correction unit of the signal defect correction system.

Initially, signal defect correction system 24 receives playback signal 23 (step 50) from analog front end 12 (FIG. 12). Playback signal 23 includes a signal defect that may disrupt magnetic data storage system 10 from recovering data stored on magnetic media 14. Playback signal 23 may be asymmetric in the time domain and characterized by a voltage spike and subsequent decay to a normal pattern of signal peaks.

Upon receiving playback signal 23, signal defect correction system 24 applies a matched FIR filter to playback signal 23 (step 52), tracks the amplitude of playback signal 23 normal pattern signal peaks (step 54), and delays playback signal 23 (step 55). In accordance with FIG. 2, FIG. 3 illustrates signal defect correction system 24 performing steps 52, 54, and 55 in parallel.

The matched FIR filter applied to playback signal 32 in step 52 may comprise a digital FIR filter, such as matched FIR filter 32 described in FIG. 2, designed such that its impulse response is the time reversed, complex conjugate of the signal defect model for playback signal 23. The signal defect model may be generated as previously described in this disclosure, i.e., by selecting a best fit model based on a plurality of sample playback signals that each includes a signal defect. The signal defect model is then digitized and the filter coefficients may be set as a time reversed copy of the signal defect model. By setting the filter coefficients in this manner, the response of the matched FIR filter to a signal defect may be substantially similar to or the same as the autocorrelation of the signal defect. Consequently, matched FIR filter 32 has a low amplitude partial response to normal pattern signal peaks but has a large amplitude response to a signal defect. The impulse response of the matched FIR filter is also linear. As a result, the peak response of the matched FIR filter is proportional to the peak amplitude of the signal defect and to the peak amplitude of the normal signal.

Accordingly, signal defect correction system 24 tracks the amplitude of playback signal 23 normal pattern signal peaks (step 54). For example, signal defect correction system 24 may track the amplitude of normal pattern signal peaks for playback signal 23 and apply a matched FIR filter to playback signal 23 as shown. Signal defect correction system 24 may track the amplitude of normal pattern signal peaks for playback signal 23 to establish a programmable FIR threshold used for detecting a signal defect in playback signal 23. The HIGH threshold may be selected larger than the normal pattern partial response, but smaller than the peak response for the smallest signal defect of interest. In some embodiments, signal defect correction system 24 may track the amplitude response to establish two thresholds, e.g., a HIGH and a LOW threshold. The LOW threshold may be selected based on the HIGH threshold to provide a hysteresis for a degree of noise immunity. Additionally, the programmable FIR threshold may be useful for grading magnetic media for commercial use as previously described in this disclosure.

Signal defect correction system 24 delays playback signal 23 (step 55) to allow for signal processing steps to be performed, e.g., steps 56, 58, 60, 62, and 64. For example, signal defect correction system 24 may utilize a buffer to delay playback signal 23 by a length of time determined by the length of the FIR matched filter and other logic delays.

Signal defect correction system 24 uses the amplitude response of the matched FIR filter to detect a signal defect (step 56) in playback signal 23. For example, signal defect correction system 24 may detect a signal defect by comparing the amplitude response of the matched FIR filter to a programmable FIR threshold, e.g., the HIGH threshold. When the amplitude response is less than the HIGH threshold, a signal defect is not detected and signal defect correction system 24 receives the next sample of the playback signal 23 (step 50) without performing steps 58, 60, 62, and 64. However, when the amplitude response is greater than or equal to the HIGH threshold, signal defect correction system 24 detects a signal defect and applies signal processing techniques to determine amplitude and location estimates (step 58) for the signal defect.

Signal defect correction system 24 may use peak detection techniques known in the art to detect a peak amplitude estimate that corresponds to the peak of the signal defect. As an example, after detecting a signal defect, signal defect correction system 24 may compare the amplitude response for each subsequent sample of playback signal 23 to the greatest amplitude response of a previous sample of playback signal 23. The greatest amplitude response is stored as the peak amplitude estimate.

Signal defect correction system 24 may determine a location or delay estimate based on the length of the matched FIR filter and logic delays associated with system 24. Thus, the location estimate may be initially stored in signal defect correction system 24 as a constant, pre-determined value. However, because the location estimate may be used by signal defect correction system 24 to locate a signal defect in playback signal 23, signal defect correction system 24 may decrement the location estimate for each clock cycle from the time the peak amplitude estimate is obtained to the time that the amplitude response of the matched FIR filter drops below the LOW threshold. The resulting location estimate corresponds to the location of the signal defect because the stored value equals the pre-determined value minus the interval of time from receiving playback signal to detecting the peak amplitude estimate.

Signal defect correction system 24 may retrieve the signal defect model from a memory using the location estimate (step 60) as previously described in this disclosure. For example, the signal defect model signal defect correction system 24 may include a counter that is loaded with the location estimate when the amplitude response of the matched FIR filter drops below the LOW threshold. When the counter is triggered, signal defect correction system may retrieve the signal defect model from memory. The signal defect model may be stored such that consecutive bits of the signal defect model are stored at consecutive addresses within the memory or such that blocks of consecutive bits of the signal defect model are stored at consecutive addresses within the memory. Consequently, signal defect correction system may load the address at which the most significant bit of the signal defect model is stored when counter is triggered and subsequently scale the signal defect model using the amplitude estimate (step 62). Signal defect correction system 24 may then apply the signal defect model to the delayed playback signal 23 (step 64) on a bit-by-bit basis (where consecutive bits of the signal defect model are stored at consecutive addresses within the memory) or on a block-by-block basis (where blocks of consecutive bits of the signal defect model are stored at consecutive addresses within the memory) to substantially remove the signal defect.

Figure 4:
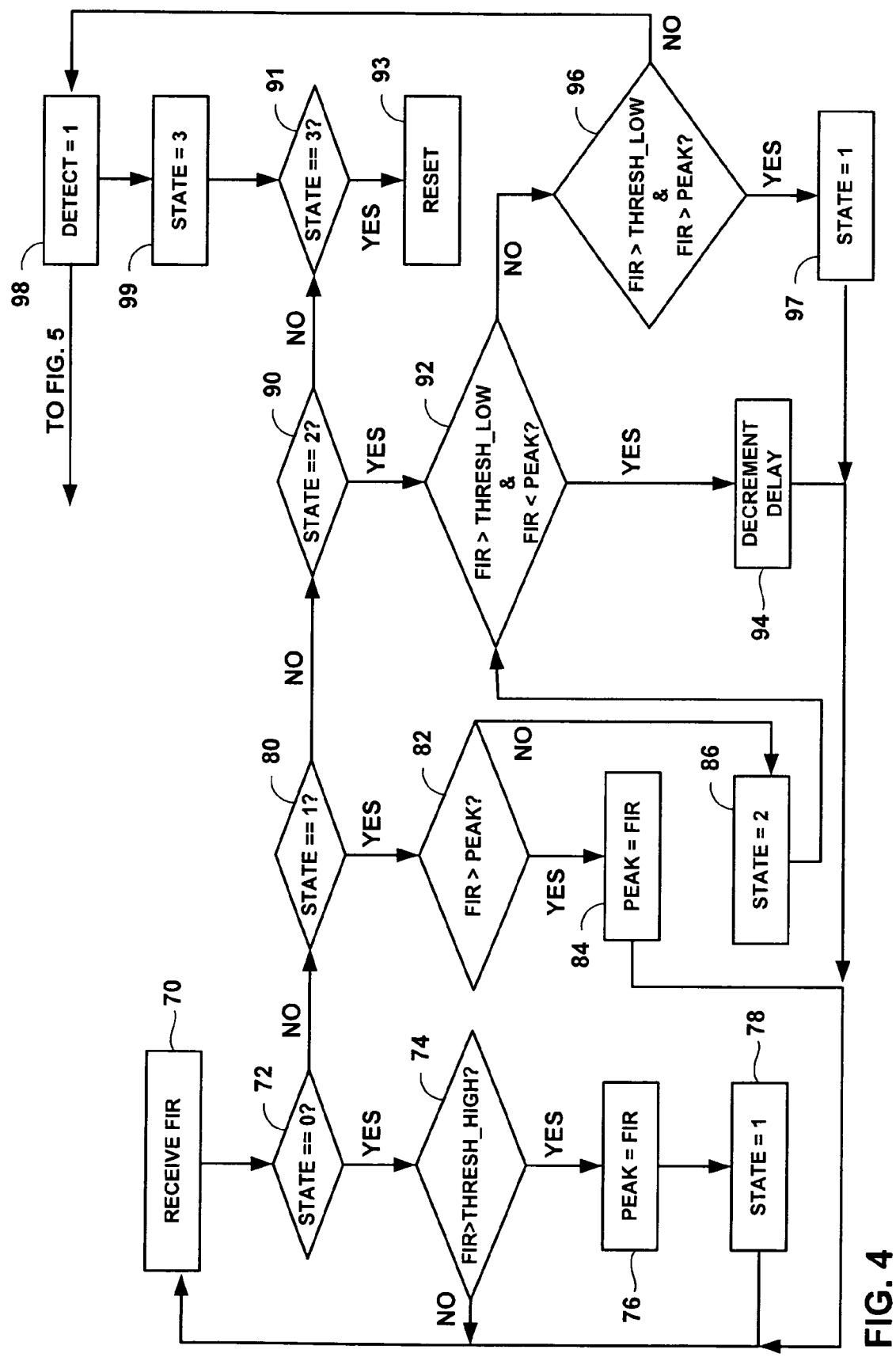
FIG. 4 is a flowchart illustrating exemplary operation of a detect and estimate unit of the signal defect correction system.

FIG. 4 is a flowchart illustrating exemplary operation of detect and estimate unit 38 of signal defect correction system 24. In particular, the flow chart shown in FIG. 4 is intended to illustrate logical behavior of detect and estimate unit 38 and corresponds to a finite state machine that may be implemented by detect and estimate unit 38. Detect and estimate unit 38 generally detects a signal defect in playback signal 23 and forms an amplitude and location estimate of the signal defect. The amplitude estimate corresponds to the peak amplitude response of the matched FIR filter, such as matched FIR filter 32. The location estimate corresponds to the location of the signal defect.

The inputs to the finite state machine shown in FIG. 4 are the amplitude response of the matched FIR filter, e.g., matched FIR filter 32, and programmable FIR thresholds, e.g., a HIGH and a LOW threshold, that may be determined by tracking the amplitude of normal pattern signal peaks of playback signal 23. The amplitude response of matched FIR filter 32 and the HIGH and LOW threshold values are represented in FIG. 4 by "FIR," "THRESH_HIGH," and "THRESH_LOW," respectively. The outputs of the finite state machine are the peak response of matched FIR filter 32, i.e., the amplitude estimate of the signal defect, and a delay signal, i.e., the location estimate. The amplitude and location estimates are represented in FIG. 4 by "PEAK" and "DELAY," respectively. The state of the finite state machine is represented as "STATE" and is initially set to zero.

The finite state machine shown in FIG. 4 begins by receiving the amplitude response of matched FIR filter 32 (step 70) and detecting the state (step 72). When the finite state machine is in state zero, detect and estimate unit 38 compares FIR to THRESH_HIGH (step 74). If FIR is not greater than THRESH_HIGH, estimate and detect unit 38 receives the next sample of playback signal 23 (step 70). However, when FIR is greater than THRESH_HIGH, estimate and detect unit sets the amplitude estimate (PEAK) equal to the amplitude response of matched FIR filter 32 (FIR) (step 76) and the state (STATE) equal to one (step 78).

As a result, when detect and estimate unit 38 receives the amplitude response of matched FIR filter 32 to the next sample of playback signal 23 (step 70), unit 38 enters the state one (step 80). In state one, detect and estimate unit 38 determines if FIR is greater than PEAK (step 82). If FIR is greater than PEAK, detect and estimate unit 38 sets PEAK equal to FIR (step 84) and receives the amplitude response of matched FIR filter 32 to the next sample of playback signal 23 (step 70). If FIR is not greater than PEAK, detect and estimate unit sets STATE equal to two (step 86) and determines if FIR is less than THRESH_LOW and if FIR is less than PEAK (step 92). Generally, the finite state machine repeats steps 70, 80, 82, and 84 to detect the peak amplitude response of matched FIR filter 32. The finite state machine transitions into state two when the amplitude response of matched FIR filter 32 is less than the previous amplitude response. The transition corresponds to the portion of the amplitude response following the signal peak, i.e., the negative slope of the impulse response.

If FIR is greater than THRESH_LOW and if FIR is less than PEAK, detect and estimate unit 38 decrements DELAY (step 94) and receives the impulse response of matched FIR filter 32 to the next sample of playback signal 23 (step 70). Detect and estimate unit 38 detects that it is in state two (step 90) and, thus, repeats steps 90, 92, and 94 until determining that the amplitude response of matched FIR filter 32 for a signal defect has been captured, i.e., amplitude and location estimates have been stored.

However, if detect and estimate 38 determines that the conditions of step 92 are not satisfied, unit 38 determines if FIR is greater than THRESH_LOW and if FIR is greater than PEAK (step 96). The finite state machine includes step 96 to check for a double peak. Accordingly, when detect and estimate unit 38 determine that the conditions of step 96 are satisfied, unit 38 sets STATE equal to one (step 97) and the finite state machine returns to state one, i.e., returns to step 82. However, if detect and estimate unit 38 determines that the conditions of step 96 are not satisfied, the amplitude response of matched FIR filter 32 must be less than PEAK and also less than THRESH_LOW thereby indicating that the impulse response to a signal defect has been captured. Consequently, detect and estimate unit sets DETECT equal to one (step 98) and signal defect correction system 24 may retrieve the signal defect model from memory and apply the model to playback signal to substantially remove the signal defect. As shown in FIG. 4, signal defect correction system 24 uses DETECT as an input to a finite state machine shown in FIG. 5 to illustrate operation of correction unit 40.

When DETECT is set equal to one, detect and estimate unit 38 sets STATE equal to three (step 99) and the finite state machine enters state three (step 91). In state three, the finite state machine resets itself (step 93), i.e., resets STATE, DETECT, and PEAK equal to zero. The finite state machine transitions into state three when the impulse response is complete. In other words, when the finite state machine detects the peak and the subsequent negative slope drops below THRESH_LOW, the finite state machine resets itself to detect a new signal defect.

Figure 5:
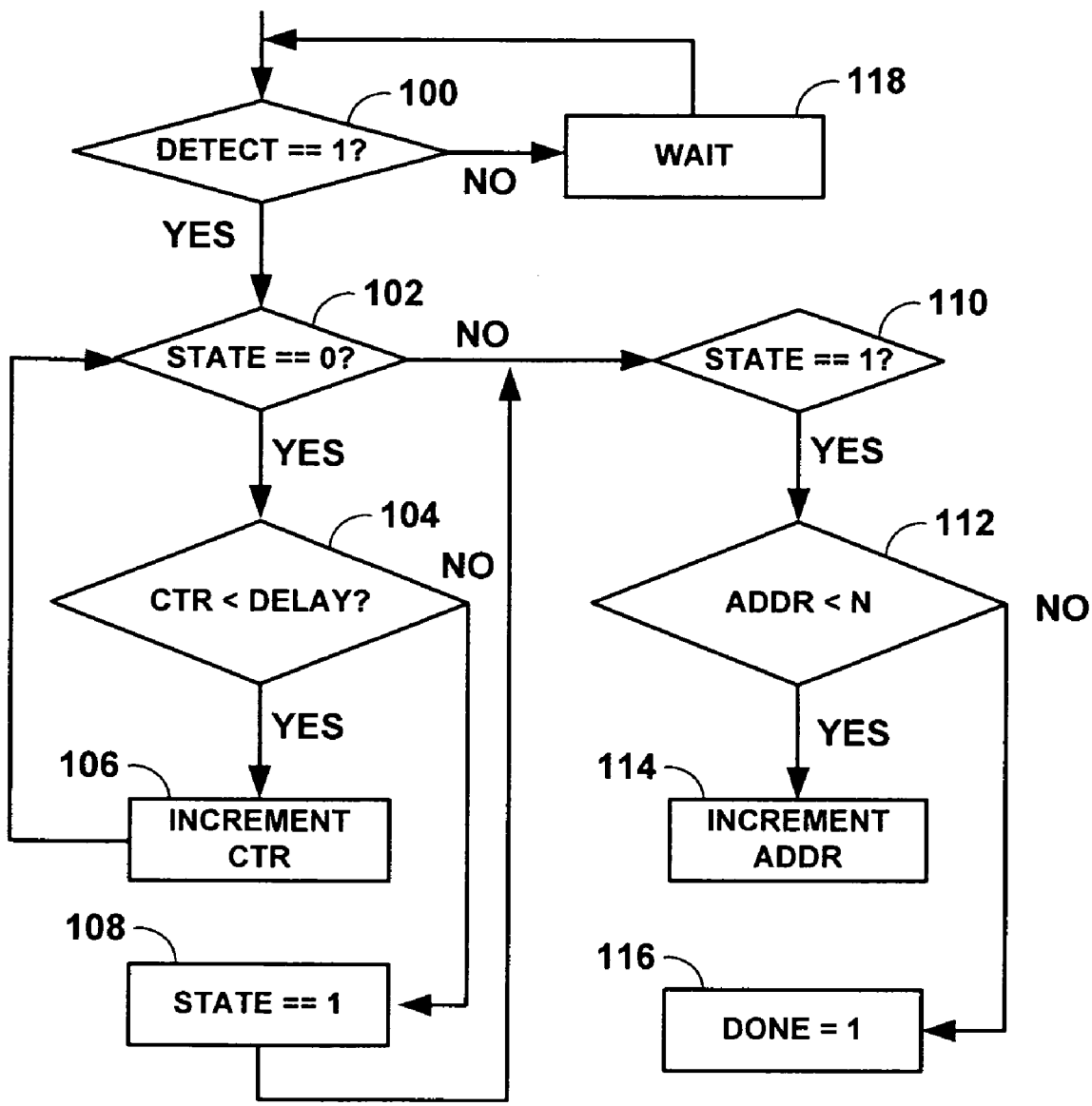
FIG. 5 is a flow chart illustrating exemplary operation of a correction unit of the signal defect correction system.

FIG. 5 is a flow chart illustrating exemplary operation of correction unit 40 of signal defect correction system 24. In particular, the flow chart shown in FIG. 5 is intended to illustrate logical behavior of correction unit 40 and corresponds to a finite state machine that may be implemented by correction unit 40. Correction unit generally uses the location estimate, e.g., DELAY of FIG. 5, to retrieve the signal defect model from a memory, e.g., memory 42.

The inputs to the finite state machine shown in FIG. 5 are the DETECT and DELAY values that are determined by detect and estimate unit 38 by following the flow chart of FIG. 4. The finite state machine of FIG. 5 also utilizes a counter (CTR), an address in memory at which the most significant bit of the signal defect model is stored (ADDR), an address in memory at which the least significant bit of the signal defect model is stored (N), and a value that indicates that the steps of the finite state machine have been completed (DONE). Additionally, the state of the finite state machine is represented as "STATE" and is initially set to zero.

The finite state machine shown in FIG. 5 begins by determining if a signal defect has been detected by detect and estimate unit 38, i.e., by determining if DETECT is equal to one (step 100). If DETECT is not equal to one, correction unit 40 waits (step 118) for the next clock cycle to check the value of DETECT again, i.e., repeats step (100). If DETECT is equal to one, correction unit 40 detects the state (step 102). When correction unit 40 is in state zero, correction unit 40 compares CTR to DELAY (step 104). If CTR is less than DELAY, correction unit 40 increments CTR (step 106) and repeats steps 102 and 104. However, if CTR is not less than DELAY, correction unit 40 sets STATE equal to one (step 108).

When correction unit 40 determines that it is in state one (step 110), unit 40 compares ADDR to N (step 112). As mentioned previously, ADDR may represent the address in memory at which the most significant bit of the signal defect is stored and N may represent the address in memory at which the least significant bit of the signal defect is stored. Alternatively, when consecutive addresses within memory store blocks of consecutive bits of the signal defect model, ADD may represent the address in which the block of bits including the most significant bit is stored and N may represent the address in memory at which the block including the least significant bit of the signal defect is stored. In any case, when ADDR is less than N, correction unit 40 increments ADDR (step 114). Because consecutive bits of the signal defect model, or consecutive blocks of bits of the signal defect model, may be stored at consecutive addresses of a memory, incrementing ADDR may generally correspond to adding a constant value to ADDR that results in ADDR representing the address at which the next bit, or block of bits, of the signal defect model is stored. Thus, repeating steps 112 and 114 results in retrieving the signal defect model from memory on a bit-by-bit or block-by-block basis. When ADDR is not less than N, correction unit 40 sets DONE equal to one (step 116) thereby indicating that the signal defect model has been retrieved from memory.

Figure 6B:
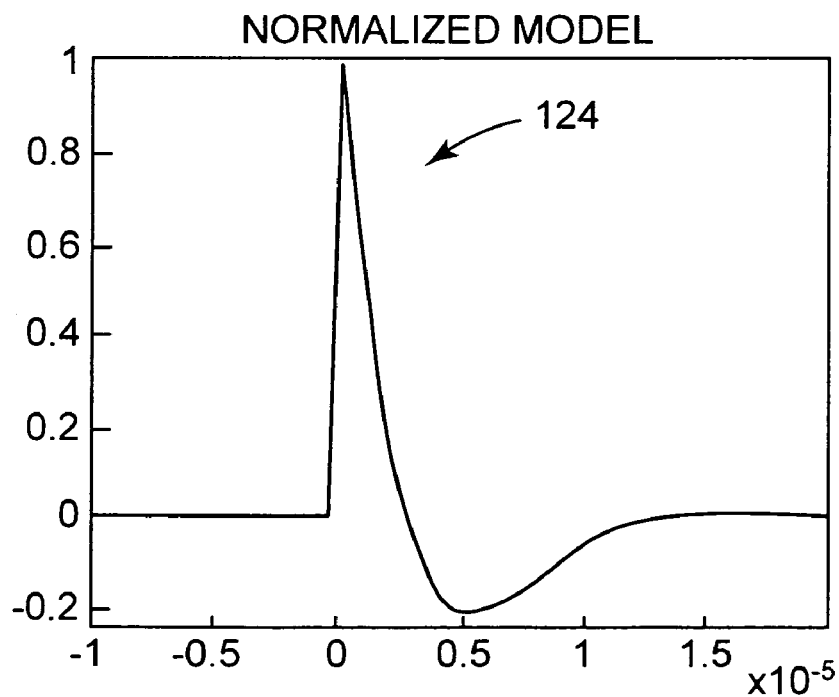

FIGS. 6A and 6B are graphs illustrating an exemplary signal defect and signal defect model, respectively. The graph illustrated in FIG. 6A shows an exemplary playback signal 120 generated by an LTO magnetic tape servo recording. Exemplary playback signal 120 includes a thermally induced signal defect 122 that is characterized by a voltage spike and subsequent decay to a normal signal pattern. The voltage spike disrupts the normal pattern associated with the LTO servo frames and disrupts the recovery of data from the tape or may be marked as unusable by the system.

FIG. 6B illustrates a signal defect model 124 for signal defect 122 of playback signal 120. To generate signal defect model 124, a plurality of sample playback signals (not shown) that each includes a thermally induced playback signal may be generated for the LTO magnetic tape servo system of FIG. 6A. Signal defect model 124 may be generated by selecting a best fit model for the sample playback signals.

In FIG. 6B, for example, the analytic expressed used to model an LTO signal defect of unit amplitude at a time $t_0$ is given by the following expression:

$$Y(t) = 0, \text{ for } t \leq \left(t_0 - \frac{1}{3}\right) (u\text{sec})$$

$$Y(t) = 3(t - t_0) + 1, \text{ for } \left(t_0 - \frac{1}{3}\right) < t < t_0 \ (u\text{sec})$$

$$Y(t) = \frac{-1}{\sqrt{1-\xi^2}} e^{\xi \omega_n (t - t_0)} \sin\left(\omega_n \sqrt{1-\xi^2}\ (t - t_0) + \tan^{-1}\left(\frac{-\sqrt{1-\xi^2}}{\xi}\right)\right),$$

$$\text{for } t \geq t_0 \ (u\text{sec})$$

In the expression given above, $\omega_n$ is the natural decay frequency and $\xi$ is the damping ratio.

Figure 7B:
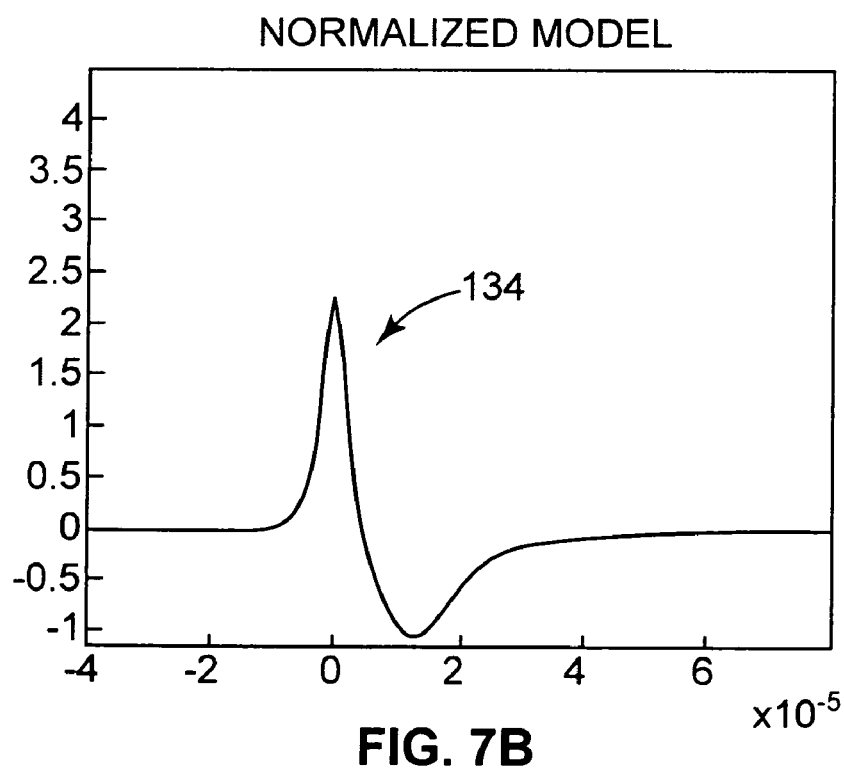
Figure 8A:
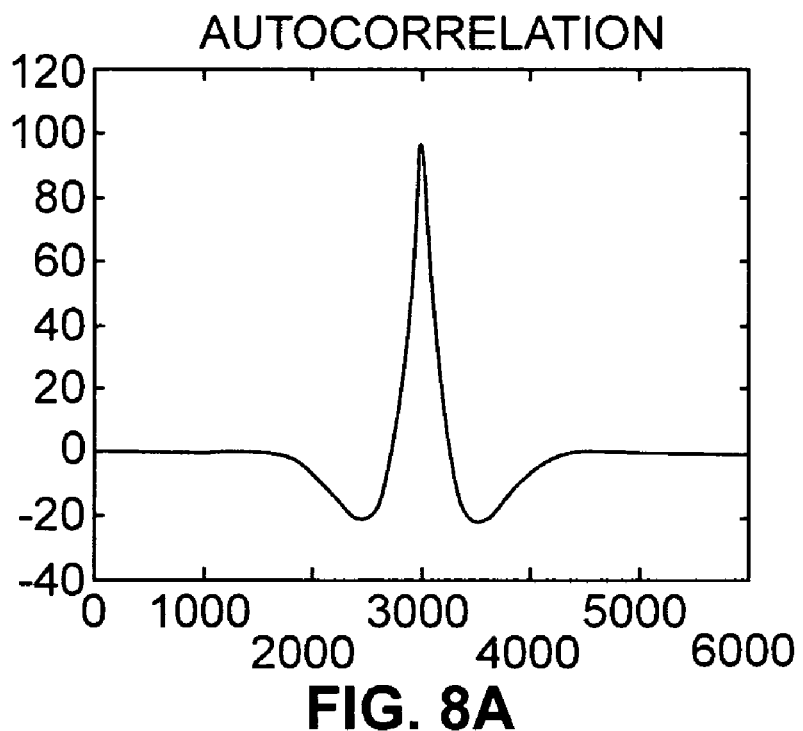
FIGS. 8A and 8B are graphs illustrating an autocorrelation function of the signal defect model for the signal defect model shown in FIGS. 6B and 7B, respectively.
Figure 8B:
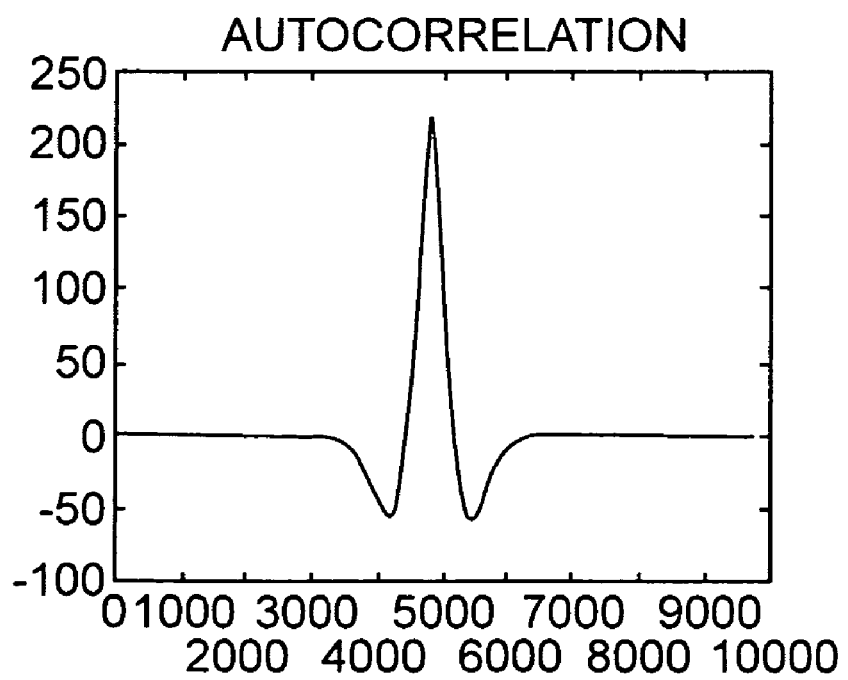

FIGS. 7A and 7B are graphs illustrating another exemplary signal defect and signal defect model for a different magnetic tape recording system, respectively. As shown in FIG. 7A, exemplary playback signal 130 includes a signal defect 132 characterized by a voltage spike and a longer decay or relaxation time in comparison to signal defect 122 of FIG. 6A.

FIG. 7B illustrates a signal defect model 134 for signal defect 132 of playback signal 130. The analytic form for signal defect model 134 as shown in FIG. 7B may, for example, use two closely spaced Lorentzian isolated magnetic transitions given according to the following expression:

$$Y(t) = \frac{A_1}{1 + \left(\frac{(t-t_1)}{PW_1/2}\right)^2} + \frac{A_2}{1 + \left(\frac{(t-t_2)}{PW_2/2}\right)^2},$$

where $A_1$ is the amplitude of pulse 1, $t_1$ is the time for the peak of pulse 1, $PW_1$ is the height of pulse 1 at 50% amplitude, $A_2$ is the amplitude of pulse 2, $t_2$ is the time for the peak of pulse 2, and $PW_2$ is the height of pulse 2 at 50% amplitude.

FIGS. 8A and 8B are graphs illustrating an autocorrelation function of signal defect models 124 and 134 shown in FIGS. 6B and 7B, respectively. The autocorrelation functions shown in FIGS. 8A and 8B are characterized by a distinct amplitude peak at the origin and values approximately equal to zero everywhere else because of the asymmetry of the corresponding signal defects in the time domain.

FIG. 9 is a graph illustrating an exemplary finite impulse response (FIR) matched filter for an LTO magnetic recording system, such as the LTO magnetic recording system associated with FIGS. 6A and 6B. The digital filter shown in FIG. 9 may be constructed such that the impulse response is the time reversed, complex conjugate of the signal defect model. The response of the filter may be given according to the following expression:

$$y(n) = \sum_{k=0}^{N-1} x(n-k)b(k)$$

$$= x(n)b(0) + x(n-1)b(1) + \ldots + x(n-k)b(k) + \ldots +$$

$$x(n-N+1)b(N-1)$$

Accordingly, FIG. 9 illustrates the coefficients of the matched FIR filter, e.g., matched FIR filter 32, by setting the coefficients of the filter to the time reversed coefficients of the signal defect model.

Accordingly, the matched filter may be constructed by first selecting the normalized signal defect model for the desired magnetic data storage system, e.g., by selecting a best fit model from a plurality of sample playback signals for the system. The normalized signal defect model may then be digitized to a selected coefficient bit width and FIR length. In particular, the coefficient bit width and FIR length may be selected based on a performance and processing complexity tradeoff. For example, a filter designed with a larger coefficient bit width and greater length may provide improved performance, but at the expense of increased processing complexity. Thus, the coefficient bit width and FIR length may be carefully selected to provide the desired performance with the least amount of processing complexity.

Generally, a relatively small window with narrow coefficients and a length of less than approximately 100 taps may be sufficient to detect a signal defect. In the illustrated example of FIG. 9, the coefficients are 3 bits wide and the length is 66 taps. The parameters were selected to represent only the positive portion of the normalized signal defect model.

FIG. 10 shows graphs that illustrate a servo playback signal 140 and the FIR response 144 of a matched FIR filter to playback signal 140. The matched FIR filter is designed in accordance with the techniques described in this disclosure. Playback signal 140 includes a signal defect 142 characterized by a voltage spike and subsequent decay. As previously described, FIR response 144 is characterized by a low amplitude partial response 146 to the normal pattern signal peaks of playback signal 140 and a large amplitude response 148 to signal defect 142.

Figure 11:
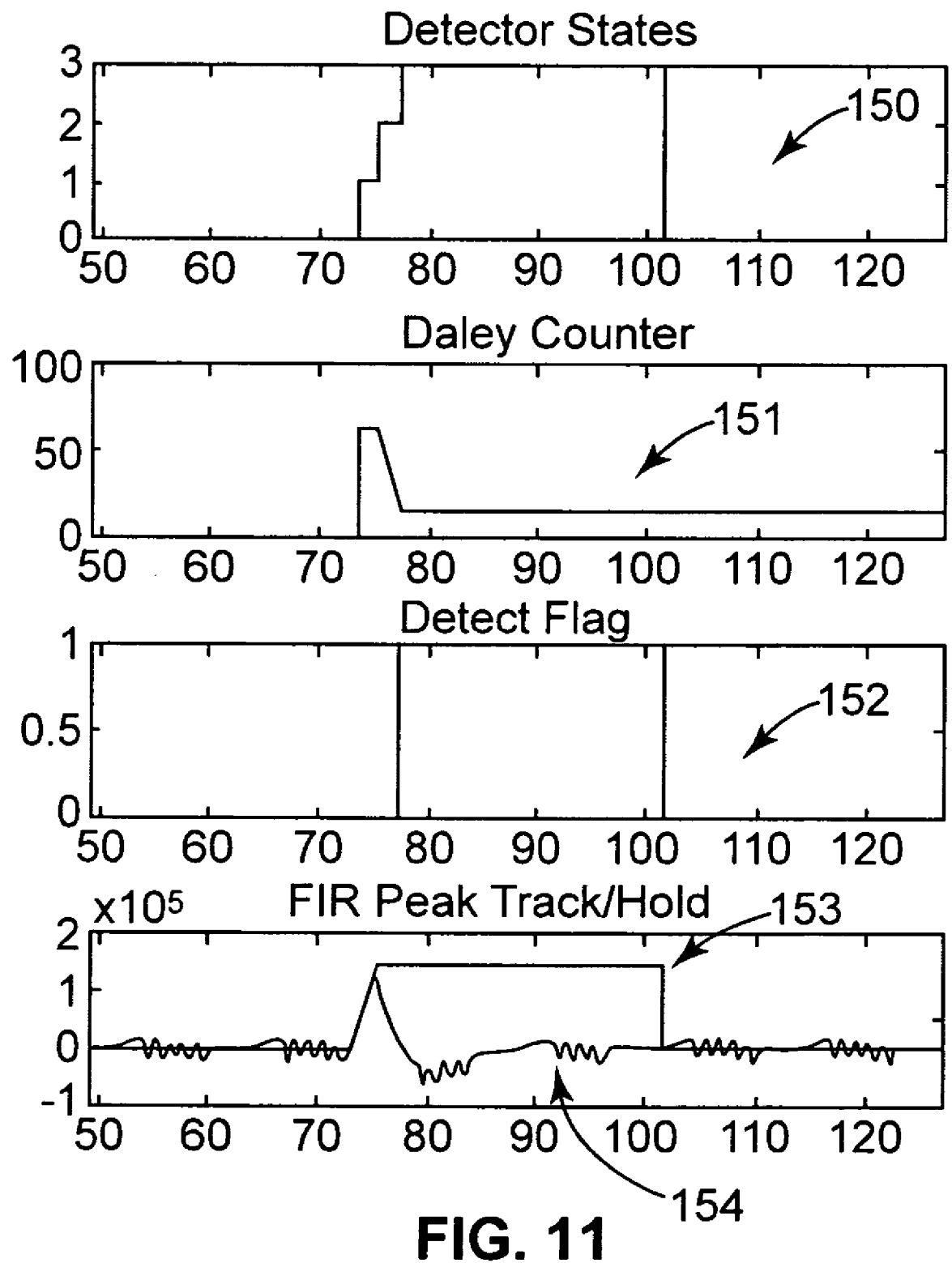
FIG. 11 shows graphs illustrating logic output of the detection unit of the signal defect correction system.

FIG. 11 show graphs 150-153 illustrating logic output of detect and estimate unit 38 in accordance with the flow chart of FIG. 4. In particular, graphs 150-153 collectively provide an overview of the logic output of detect and estimate unit 38 in accordance with the flow chart of FIG. 4. For example, graph 150 illustrates the states of detect and estimate unit 38 and graphs 151-153 illustrate the values of the delay counter (DELAY in FIG. 4), detect flag (DETECT in FIG. 4) and FIR peak track/hold (PEAK in FIG. 4), respectively. Thus, graphs 150-153 illustrate the timing relationship of each state of detect and estimate unit 38 with a corresponding parameter. As an example, graph 151 illustrates the delay counter being loaded with a pre-determined value when detect and estimate unit 38 enters state one and the delay counter being decremented when unit 38 enters state two. The value of the delay counter remains constant when detect and estimate unit 38 enters state three because the delay counter is no longer used by unit 38.

Using graph 152 as another example, graph 152 illustrates the detect flag being set equal to one in response to detect and estimate unit 38 entering state three. With respect to graph 153, the FIR peak track/hold, i.e., amplitude estimate, is illustrated as being initially set equal to zero. The value of the amplitude estimate increases when detect and estimate unit 38 operates in state one, and holds for the remaining time over which unit 38 operates. To further illustrate the relationship between the logic output of detect and estimate unit 38 and the amplitude response of the matched FIR filter, FIG. 11 includes an exemplary amplitude response 154 to a playback signal overlayed with graph 153.

FIG. 12 show graphs illustrating logic output of correction unit 40 in accordance with the flow chart of FIG. 5. In particular, graphs 160-163 collectively provide an overview of the logic output of correction unit 40 in accordance with the flow chart of FIG. 5. For example, graph 160 illustrates the value of the delay counter (DELAY in FIG. 5) as correction unit 40 operates, i.e., retrieves a signal defect model from a memory. In FIG. 12, graph 160 illustrates correction unit 40 loading the delay counter with a pre-determined value, holding the value for a period of time, and subsequently decrementing the value until correction unit 40 begins retrieving the signal defect model from memory.

Graph 161 illustrates the value of ADDR of FIG. 5 as correction unit 40 retrieves the signal defect model from memory. Graph 162 illustrates the values of the signal defect model corresponding to the address at which the values are stored in memory. Graph 163 illustrates the value of DONE (FIG. 5) during the operation of correction unit 40.

Figure 13:
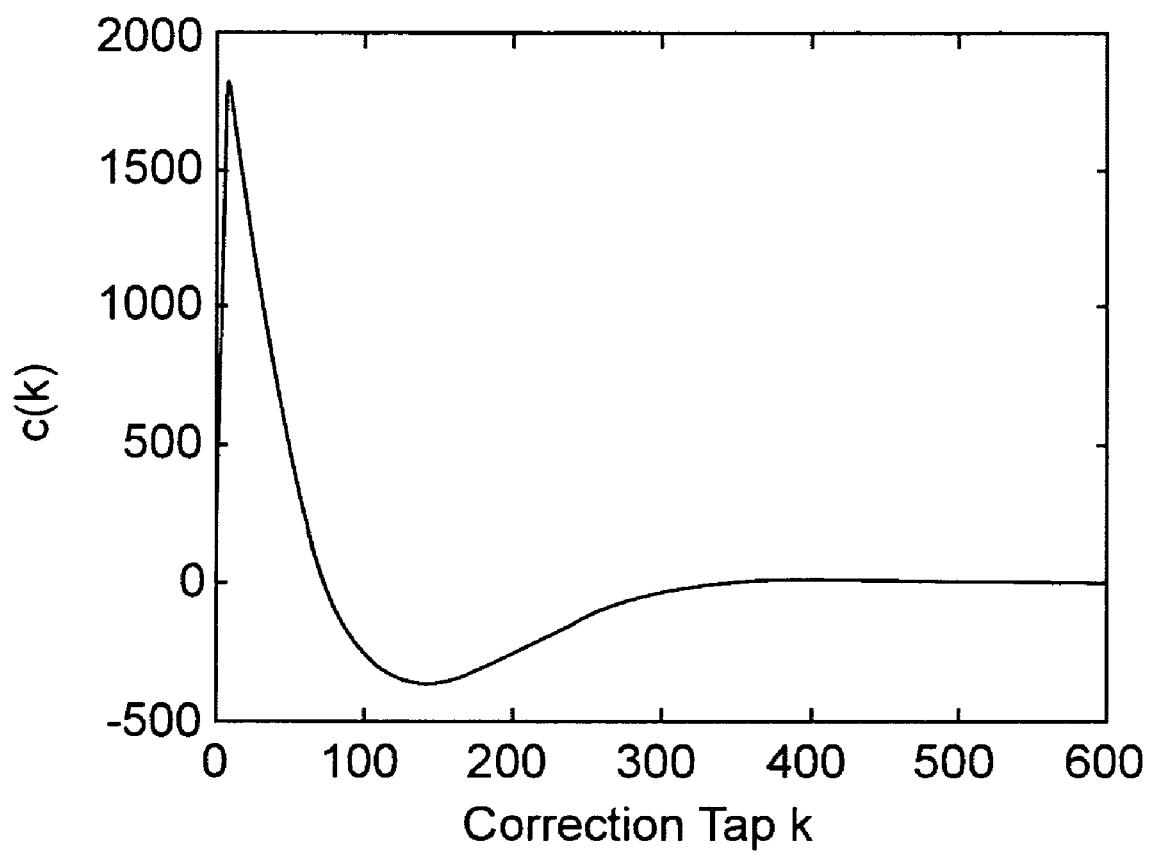
FIG. 13 is a graph illustrating the signal defect model stored within a memory of the signal defect correction system.

FIG. 13 is a graph illustrating an exemplary signal defect model stored within a memory of signal defect correction unit 24. In the illustrated example, the signal defect model is constructed with 600 points and is twelve bits wide. In general, the matched FIR filter may be constructed using a coarse truncated version of the signal defect model.

Figure 14:
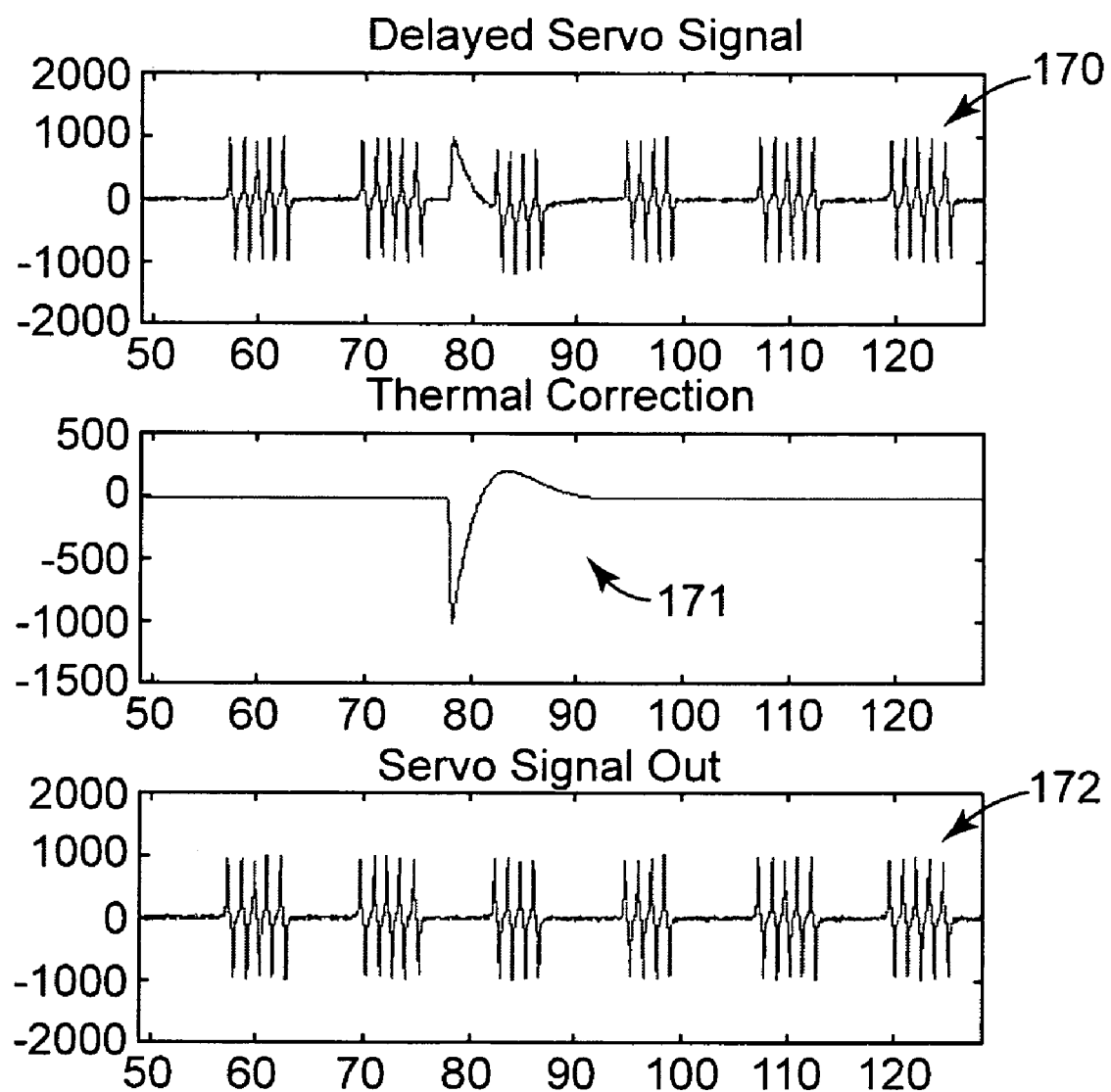
FIG. 14 shows graphs illustrating performance of an exemplary data storage system in accordance with an embodiment of the invention.

FIG. 14 show graphs 170-172 illustrating performance of an exemplary data storage system in accordance with an embodiment of the invention. In particular, graph 170 illustrates an exemplary delayed playback signal that includes a signal defect, graph 171 illustrates a signal defect model that has been retrieved from memory and scaled such that applying the signal defect model substantially removes the signal defect from the delayed playback signal, and graph 172 illustrates the delayed playback signal after the signal defect model of graph 171 has been applied. As shown in graph 172, applying the signal defect model of graph 171 to the delayed playback signal shown in graph 170 substantially removes or cancels the signal defect. In general, the quality of the cancellation is dependent on how well the signal defect model represents the actual signal asperity in the playback signal.

Figure 15:
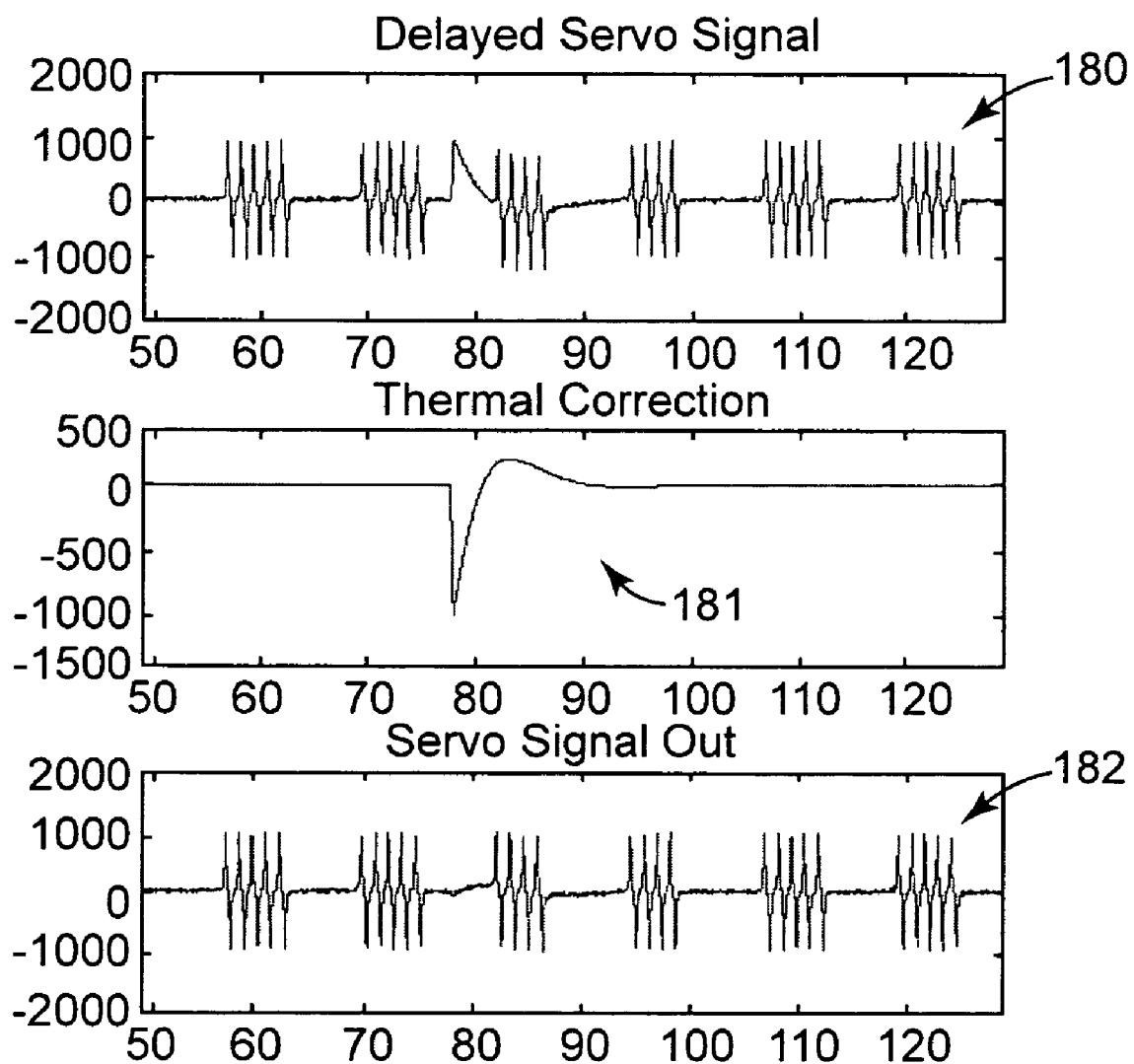
FIG. 15 shows graphs illustrating performance of another exemplary data storage system in accordance with an embodiment of the invention.

FIG. 15 shows graphs 180-182 illustrating performance of another exemplary data storage system in accordance with an embodiment of the invention. In particular, graph 180 illustrates a delayed playback signal that includes a signal defect, graph 181 illustrates a signal defect model of the signal defect in graph 180, and graph 182 illustrates the playback signal after the signal defect model of graph 181 is applied to the playback signal of graph 180. In the illustrated example, signal defect model 181 is of a lower quality than the signal defect model of FIG. 14. Consequently, graph 182 shows partial removal of the signal defect from the playback signal.

Figure 16:
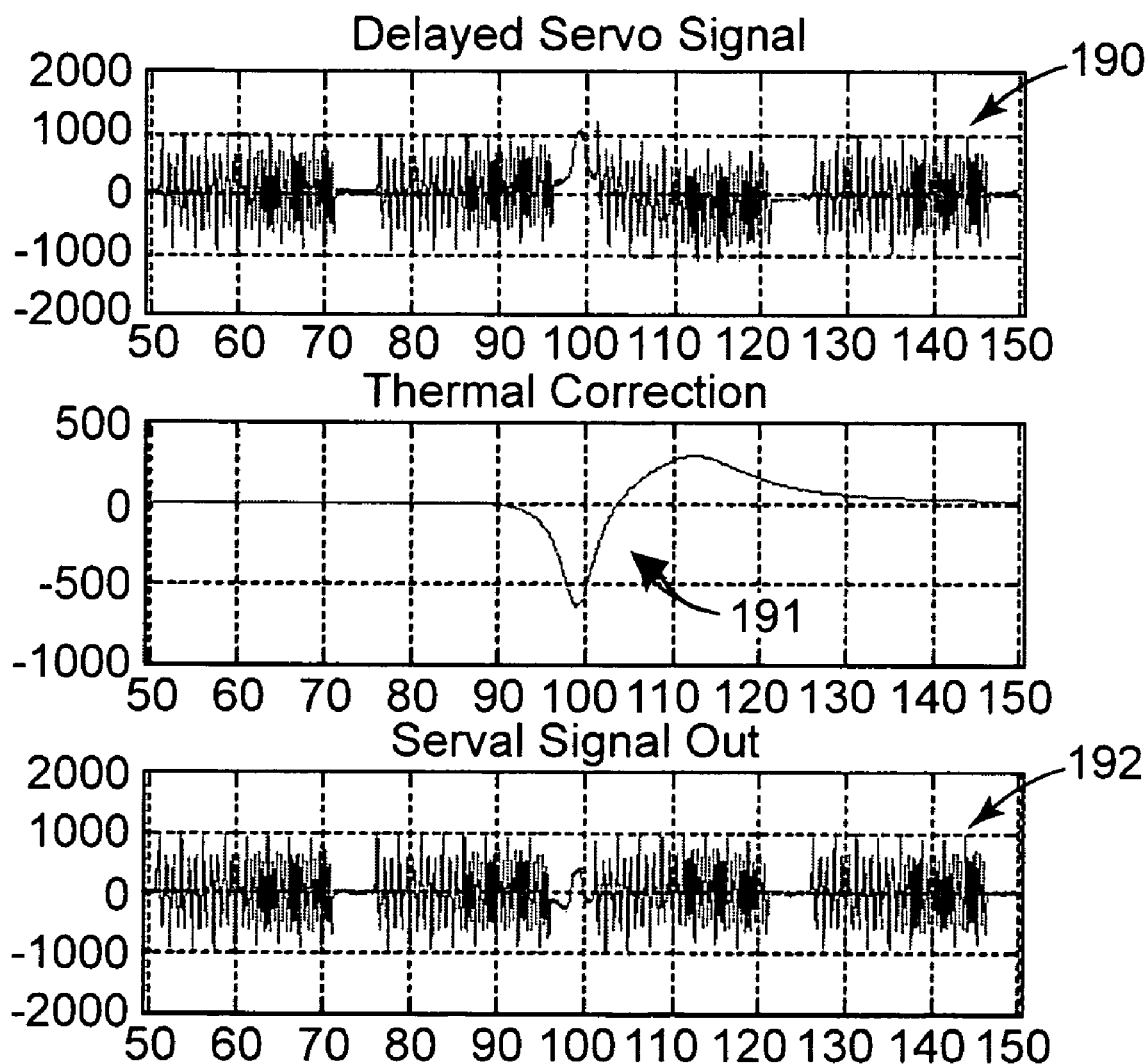
FIG. 16 shows graphs illustrating performance of yet another exemplary data storage system using a signal defect model that does not well represent a signal defect of a playback signal.

FIG. 16 shows graphs 190-192 illustrating performance of yet another exemplary data storage system in accordance with an embodiment of the invention. In particular, graph 190 illustrates a delayed playback signal that includes a signal defect, graph 191 illustrates a signal defect model of the signal defect in graph 190, and graph 192 illustrates the playback signal after the signal defect model of graph 191 is applied to the playback signal of graph 190. In the illustrated example, signal defect model 191 is of a poor quality, i.e., does not well represent the signal defect of the playback signal. As a result, graph 192 shows partial removal of the signal defect from the playback signal.

Various embodiments of the invention have been described. Although the invention has generally been described in this disclosure with respect to magnetic media and, in particular, magnetic tape, the invention may also be applied to any system in which a signal defect manifests itself in a digital signal and may be detected and substantially removed from the signal using a matched FIR filter and the signal processing techniques described in this disclosure. Consequently, it is understood that magnetic tape is merely one embodiment of the invention and may also be applied to magnetic hard disks.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable logic arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure. These and other embodiments are within the scope of the following claims.

The invention claimed is:

1. A method comprising:
receiving a playback signal from a magnetoresistive (MR) head in a data storage system;
detecting a signal defect in the playback signal; and
applying a signal defect model to the playback signal to substantially remove the signal defect from the playback signal, wherein detecting the signal defect comprises applying a matched filter to the playback signal and processing an output of the matched filter to detect the signal defect, and wherein processing the output of the matched filter further comprises processing the output to estimate a peak and a delay value, wherein the peak value corresponds to a peak amplitude of the matched filter in response to the signal defect and the delay value is related to a location of the signal defect within the playback signal.

2. The method of claim 1, wherein the matched filter comprises a finite impulse response (FIR) matched filter that is linear and, in response to receiving an impulse as an input, outputs a time reversed, complex conjugate of the signal defect model.

3. The method of claim 1, wherein the matched filter is a function of the signal defect model.

4. The method of claim 1, wherein the signal defect model is stored in a memory, the method further comprising delaying the playback signal and wherein the applying the signal defect model comprises retrieving the signal defect model from the memory based on the estimated delay value and scaling the signal defect model based on the estimated peak value such that applying the signal defect model to the delayed playback signal substantially removes the signal defect from the delayed playback signal.

5. The method of claim 1, wherein the signal defect model is stored in a memory and applying the signal defect model comprises retrieving the signal defect model from the memory and scaling the signal defect model such that applying the signal defect model to the playback signal substantially removes the signal defect from the playback signal.

6. The method of claim 5, wherein the signal defect model is stored in the memory such that consecutive bits of the signal defect model are stored at consecutive addresses of the memory, and wherein retrieving the signal defect model comprises retrieving the signal defect model from the memory on a bit-by-bit basis.

7. A method comprising:
receiving a playback signal from a magnetoresistive (MR) head in a data storage system;
detecting a signal defect in the playback signal; and
applying a signal defect model to the playback signal to substantially remove the signal defect from the playback signal, the method further comprising forming the signal defect model by selecting a best fit model based on a plurality of sample playback signals, each of die sample playback signals including a respective signal defect.

8. A method comprising:
receiving a playback signal from a magnetoresistive (MR) head in a data storage system;
detecting a signal defect in the playback signal; and
applying a signal defect model to the playback signal to substantially remove the signal defect from the playback signal, the method further comprising tracking normal pattern signal peaks of the playback signal to determine a threshold value used in detecting the signal defect.

9. A method comprising:
receiving a playback signal from a magnetoresistive (MR) head in a data storage system;
detecting a signal defect in the playback signal; and
applying a signal defect model to the playback signal to substantially remove the signal defect from the playback signal, wherein the signal defect is caused by contact between the MR head and a surface of a magnetic storage medium and is characterized by a voltage spike and a subsequent decay in a playback signal amplitude.

10. A system for retrieving information stored on magnetic media, the system comprising:
magnetic media that stores information;
an analog front end that retrieves information stored on the magnetic media and outputs a playback signal indicative of the retrieved information; and
a processor that detects a signal defect in the playback signal and, in response to detecting the signal defect, substantially removes the signal defect from the playback signal by applying a signal defect model to the playback signal, wherein the processor includes a matched finite impulse response (FIR) filter that is linear and, in response to receiving an impulse as an input, the matched FIR filter outputs a time reversed, complex conjugate of the signal defect model, and wherein the processor includes logic circuitry that processes the output of the matched FIR filter to detect the signal defect, wherein, in response to detecting the signal defect, the logic circuitry processes the output of the matched FIR filter to estimate a peak and delay value, wherein the peak value corresponds to a peak amplitude of the matched FIR filter in response to the signal defect and the delay value is related to a location of the signal defect within the playback signal.

11. The system of claim 10, further comprising a memory that stores the signal defect model and a buffer that delays the playback signal, wherein the logic circuitry retrieves the signal defect model from the memory based on the delay value and scales the signal defect model based on the peak value such that when the logic circuitry applies the signal defect model to the delayed playback signal, the signal defect is substantially removed from the delayed playback signal.

12. The system of claim 10, further comprising a memory that stores the signal defect model and a buffer that delays the playback signal, wherein the processor retrieves the signal defect model from the memory and scales the signal defect model such that when the processor applies the signal defect model to the delayed playback signal, the signal defect is substantially removed from the delayed playback signal.

13. The system of claim 10, further comprising a memory that stores the signal defect model such that consecutive bits of the signal defect model are stored at consecutive addresses of the memory, and wherein the processor retrieves the signal defect model from the memory on bit-by-bit basis and substantially removes the signal defect form the playback signal by applying each bit of the signal defect model to a corresponding sample of the playback signal.

14. A system for retrieving information stored on magnetic media, the system comprising:
magnetic media that stores information;
an analog front end that retrieves information stored on the magnetic media and outputs a playback signal indicative of the retrieved information; and
a processor that detects a signal defect in the playback signal and, in response to detecting the signal defect, substantially removes the signal defect from the playback signal by applying a signal defect model to the playback signal, wherein the processor selects the signal defect model by selecting a best fit model based on a plurality of sample playback signals, each of the sample playback signals including a respective signal defect.

15. A system for retrieving information stored on magnetic media, the system comprising:
magnetic media that stores information;
an analog front end that retrieves information stored on the magnetic media and outputs a playback signal indicative of the retrieved information;
a processor that detects a signal defect in the playback signal and, in response to detecting the signal defect, substantially removes the signal defect from the playback signal by applying a signal defect model to the playback signal; and
an amplitude tracking unit that tracks normal pattern signal peaks of respective playback signals and determines a threshold value used by the processor to detect the signal defect.

16. A system for retrieving information stored on magnetic media, the system comprising:
magnetic media that stores information;
an analog front end that retrieves information stored on the magnetic media and outputs a playback signal indicative of the retrieved information; and
a processor that detects a signal defect in the playback signal and, in response to detecting the signal defect, substantially removes the signal defect from the playback signal by applying a signal defect model to the playback signal, wherein the signal defect is caused by contact between the MR head and a surface of a magnetic storage medium and is characterized by a voltage spike and a subsequent decay in a playback signal amplitude.

* * * * *